(12) United States Patent
Park et al.

(10) Patent No.: US 11,211,977 B2
(45) Date of Patent: Dec. 28, 2021

(54) CODEBOOK-BASED UPLINK TRANSMISSION METHOD IN WIRELESS COMMUNICATION SYSTEM AND DEVICE THEREFOR

(71) Applicant: LG Electronics Inc., Seoul (KR)

(72) Inventors: Haewook Park, Seoul (KR); Jiwon Kang, Seoul (KR); Kijun Kim, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 85 days.

(21) Appl. No.: 16/623,248

(22) PCT Filed: Jun. 15, 2018

(86) PCT No.: PCT/KR2018/006788
§ 371 (c)(1),
(2) Date: Dec. 16, 2019

(87) PCT Pub. No.: WO2018/231008
PCT Pub. Date: Dec. 20, 2018

(65) Prior Publication Data
US 2021/0143874 A1    May 13, 2021

Related U.S. Application Data

(60) Provisional application No. 62/520,467, filed on Jun. 15, 2017.

(51) Int. Cl.
*H04W 72/12* (2009.01)
*H04B 7/0456* (2017.01)
*H04B 7/06* (2006.01)

(52) U.S. Cl.
CPC ........ *H04B 7/0456* (2013.01); *H04B 7/0626* (2013.01); *H04B 7/0634* (2013.01); *H04W 72/1289* (2013.01)

(58) Field of Classification Search
CPC .......... H04B 7/04; H04B 7/06; H04B 7/0417; H04B 7/0456; H04B 7/0617;
(Continued)

(56) References Cited

U.S. PATENT DOCUMENTS 8,953,540 B2* 2/2015 Ko ....................... H04B 7/0639
370/329
2012/0314808 A1   12/2012 Taoka et al.
(Continued)

OTHER PUBLICATIONS

Samsung, "UL Codebook-based Transmission," R1-1707944, 3GPP TSG RAN WG1 89, Hangzhou, P.R. China, May 6, 2017, see sections 1-2.
(Continued)

*Primary Examiner* — Shawkat M Ali
(74) *Attorney, Agent, or Firm* — Dentons US LLP

(57) ABSTRACT

Disclosed are a codebook-based uplink transmission method in a wireless communication system and a device therefor. Particularly, a method for a user equipment (UE) performing codebook-based uplink transmission in a wireless communication system includes the steps of: receiving from a base station downlink control information (DCI) for physical uplink shared channel (PUSCH) scheduling including precoding information and the number of layers; determining a precoder on the basis of the precoding information and the number of layers; and transmitting a PUSCH to which the determined precoder is applied to the base station, wherein the DCI may further include an amplitude coefficient and a phase coefficient applied to the precoder.

14 Claims, 17 Drawing Sheets

(58) Field of Classification Search
CPC ....... H04B 7/0626; H04B 7/0634; H04L 5/00; H04L 5/0048; H04L 27/00; H04W 24/10; H04W 52/36; H04W 52/367; H04W 72/04; H04W 72/0406; H04W 72/1289
USPC ........ 370/329; 375/219, 260, 267, 295, 299, 375/316

See application file for complete search history.

(56) References Cited

U.S. PATENT DOCUMENTS

| | | | |
|---|---|---|---|
| 2016/0142117 A1 | 5/2016 | Rahman et al. | |
| 2016/0156397 A1* | 6/2016 | Onggosanusi | H04L 5/005 370/252 |
| 2018/0262246 A1* | 9/2018 | Faxer | H04B 7/0452 |
| 2018/0279293 A1* | 9/2018 | Harrison | H04B 7/0417 |
| 2019/0349042 A1* | 11/2019 | Ramireddy | H04B 7/0617 |

OTHER PUBLICATIONS

LG Electronics, "Discussion on Codebook Based Transmission for UL," R1-1707600, 3GPP TSG RAN WG1 Meeting #89, Hangzhou, P.R. China, May 6, 2017, see sections 1-2.1.

ZTE, "Codebook Based UL Transmission," R1-1707113, 3GPP TSG RAN WG1 89, Hangzhou, P.R. China, May 7, 2017, see sections 1, 2.3.

* cited by examiner (a)

(b)

CODEBOOK-BASED UPLINK TRANSMISSION METHOD IN WIRELESS COMMUNICATION SYSTEM AND DEVICE THEREFOR

This application is the National Stage filing under 35 U.S.C. 371 of International Application No. PCT/KR2018/006788, filed on Jun. 15, 2018, which claims the benefit of U.S. Provisional Application No. 62/520,467, filed on Jun. 15, 2017, the contents of which are all hereby incorporated by reference herein in their entirety.

TECHNICAL FIELD

The present disclosure relates to a wireless communication system and, more specifically, to a codebook-based uplink transmission method and a device supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present disclosure is to provide a codebook-based uplink transmission method.

In addition, an object of the present disclosure is to provide a method for designing a high-resolution codebook for uplink performance improvement and an uplink transmission method based on the same.

The technical problems solved by the present disclosure are not limited to the above technical problems and other technical problems which are not described herein will become apparent to those skilled in the art from the following description.

Technical Solution

According to one aspect of the present disclosure, a method for performing codebook-based uplink transmission by a user equipment (UE) in a wireless communication system includes: receiving, from an eNB, downlink control information (DCI) for physical uplink shared channel (PUSCH) scheduling including precoding information and the number of layers; determining a precoder on the basis of the precoding information and the number of layers; and transmitting a PUSCH to which the determined precoder is applied to the eNB, wherein the DCI further includes an amplitude coefficient and a phase coefficient applied to the precoder.

According to another aspect of the present disclosure, a user equipment (UE) performing codebook-based uplink transmission in a wireless communication system includes: a transceiver for transmitting and receiving RF signals; and a processor for controlling the transceiver, wherein the processor is configured: to receive, from an eNB, downlink control information (DCI) for physical uplink shared channel (PUSCH) scheduling including precoding information and the number of layers; to determine a precoder on the basis of the precoding information and the number of layers; and to transmit a PUSCH to which the determined precoder is applied to the eNB, wherein the DCI further includes an amplitude coefficient and a phase coefficient applied to the precoder.

Preferably, when two or more antenna ports are set for the PUSCH transmission of the UE, an amplitude coefficient for a specific antenna port from among the two or more antenna ports may be predetermined as 1 and amplitude coefficients for antenna ports other than the specific antenna port may be indicted as values relative to the amplitude coefficient for the specific antenna port.

Preferably, the amplitude coefficients for the antenna ports other than the specific antenna port may be 1 or a non-zero value.

Preferably, when two or more antenna ports are set for the PUSCH transmission of the UE, a phase coefficient for a specific antenna port from among the two or more antenna ports may be predetermined as 0 and phase coefficients for antenna ports other than the specific antenna port may be indicted as values relative to the phase coefficient for the specific antenna port.

Preferably, a bitwidth for indicating the amplitude coefficient and/or the phase coefficient may be predefined or set by the eNB.

Preferably, a bitwidth for indicating the amplitude coefficient and/or the phase coefficient may be determined on the basis of capability signaling of the UE.

Preferably, the DCI may further include information indicating which one of the two or more antenna ports corresponds to the specific antenna port.

Preferably, the specific antenna port from among the two or more antenna ports may be set to a port having a strongest reference signal received power (RSRP) for a signal transmitted from the UE in the eNB.

Preferably, a set of one or more vectors including values for amplitude coefficients and/or phase coefficients as elements may be predefined, and the DCI may further include information indicating an amplitude coefficient vector and/or a phase coefficient vector in the set of one or more vectors.

Preferably, the specific antenna port may be commonly determined over a wideband.

Preferably, the amplitude coefficient and/or the phase coefficient may be individually determined for each subband.

Advantageous Effects

According to embodiments of the present disclosure, it is possible to improve uplink transmission performance by supporting a high-resolution codebook.

In addition, according to embodiments of the present disclosure, it is possible to minimize overhead of downlink control information for uplink scheduling even if a high-resolution codebook is supported.

The effects of the present disclosure are not limited to the above-described effects and other effects which are not described herein will become apparent to those skilled in the art from the following description.

DESCRIPTION OF DRAWINGS

The accompanying drawings, which are included herein as a part of the description for help understanding the present disclosure, provide embodiments of the present disclosure, and describe the technical features of the present disclosure with the description below.

MODE FOR INVENTION

Figure 1:
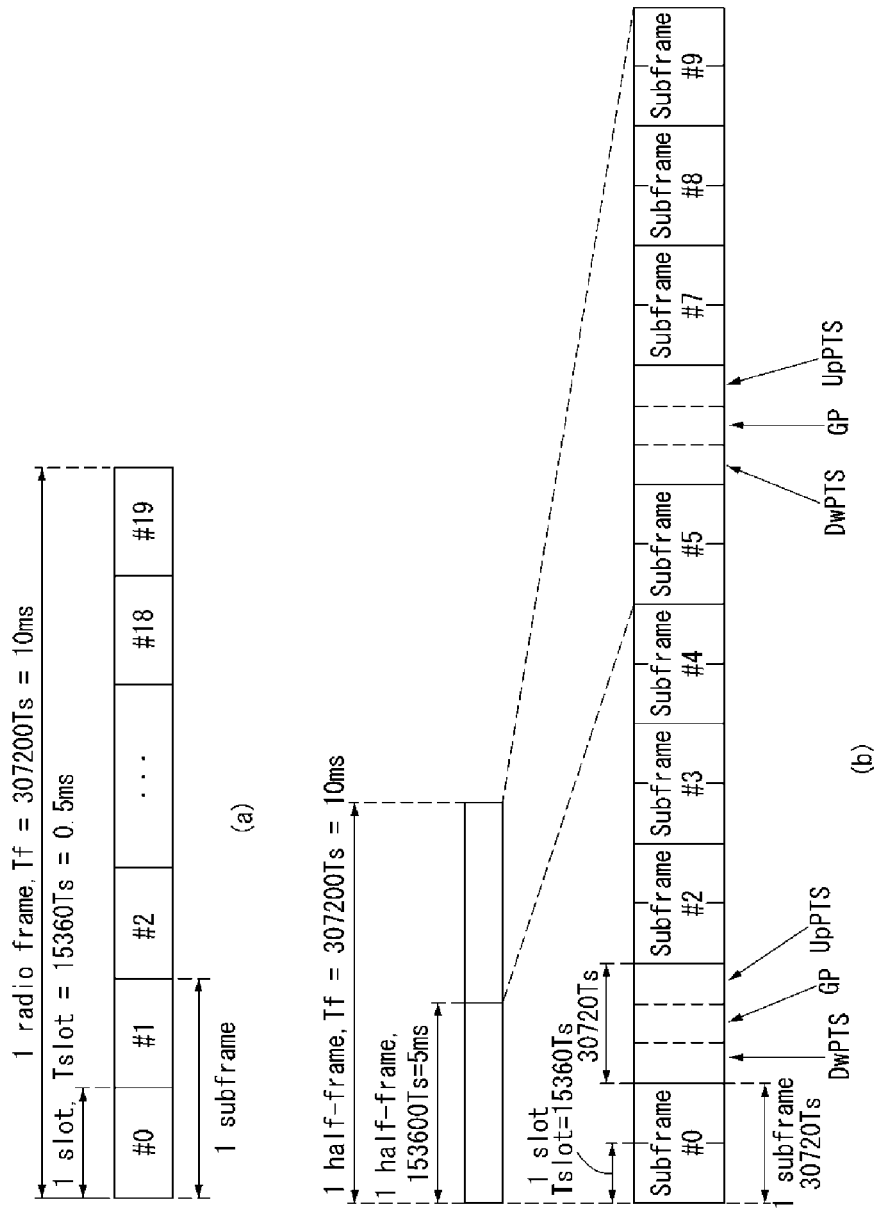
FIG. 1 illustrates the structure of a radio frame in a wireless communication system to which the present disclosure may be applied.

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), gNB, a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present disclosure, and the use of such specific terms may be changed in various forms without departing from the technical sprit of the present disclosure.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

General System to which the Present Disclosure May be Applied

FIG. 1 shows the structure of a radio frame in a wireless communication system to which an embodiment of the present disclosure may be applied.

GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | DwPTS | UpPTS Normal cyclic prefix in uplink | Extended cyclic prefix in uplink | DwPTS | UpPTS Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
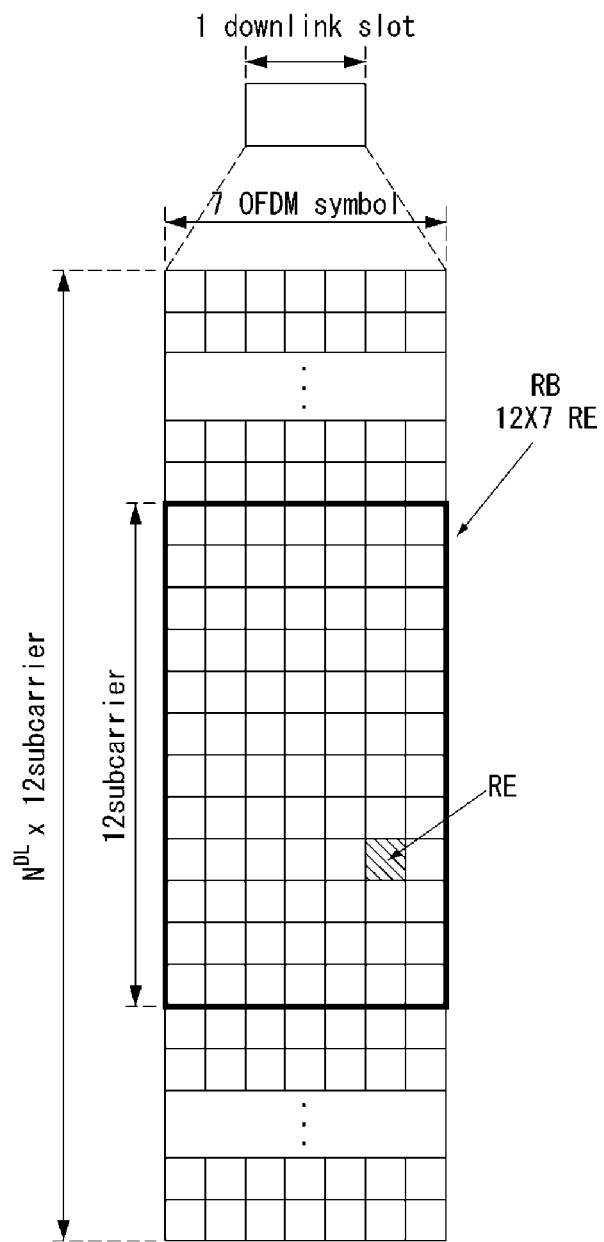
FIG. 2 is a diagram illustrating a resource grid for a downlink slot in a wireless communication system to which the present disclosure may be applied.

FIG. 2 is a diagram illustrating a resource grid for one downlink slot in a wireless communication system to which an embodiment of the present disclosure may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present disclosure is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

Figure 3:
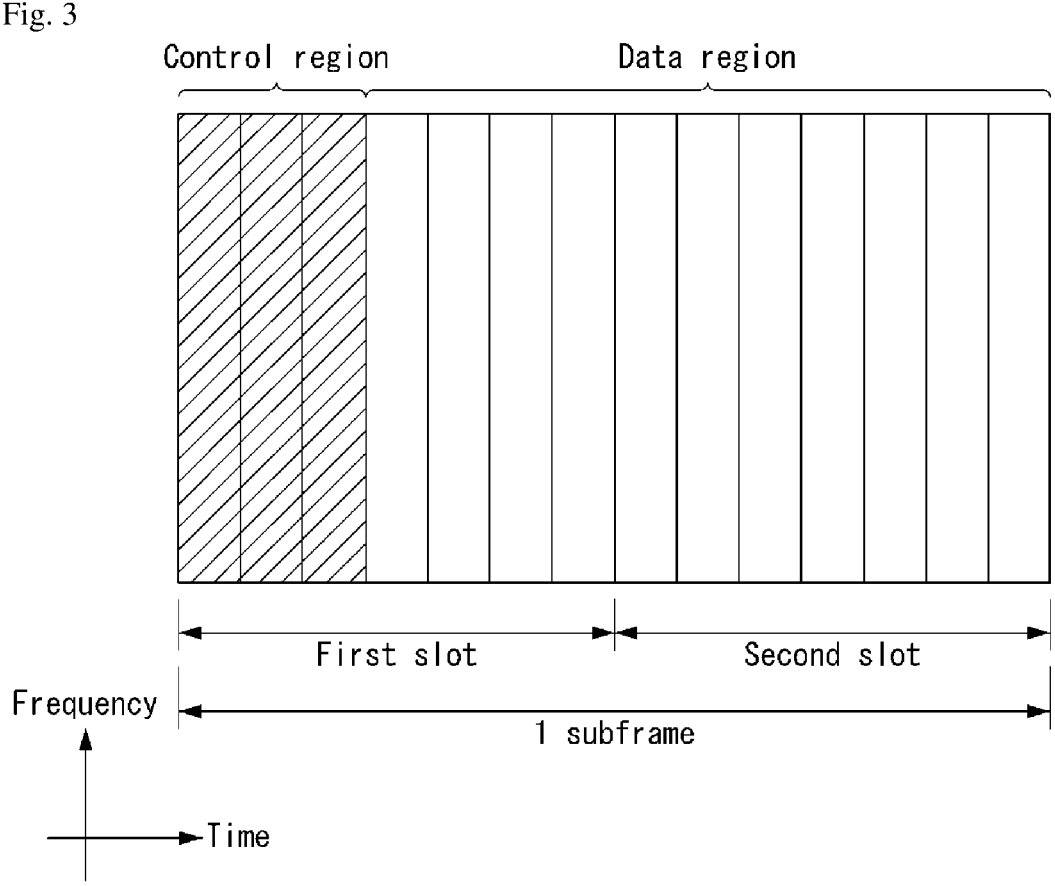
FIG. 3 illustrates a structure of downlink subframe in a wireless communication system to which the present disclosure may be applied.

FIG. 3 shows the structure of a downlink subframe in a wireless communication system to which an embodiment of the present disclosure may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
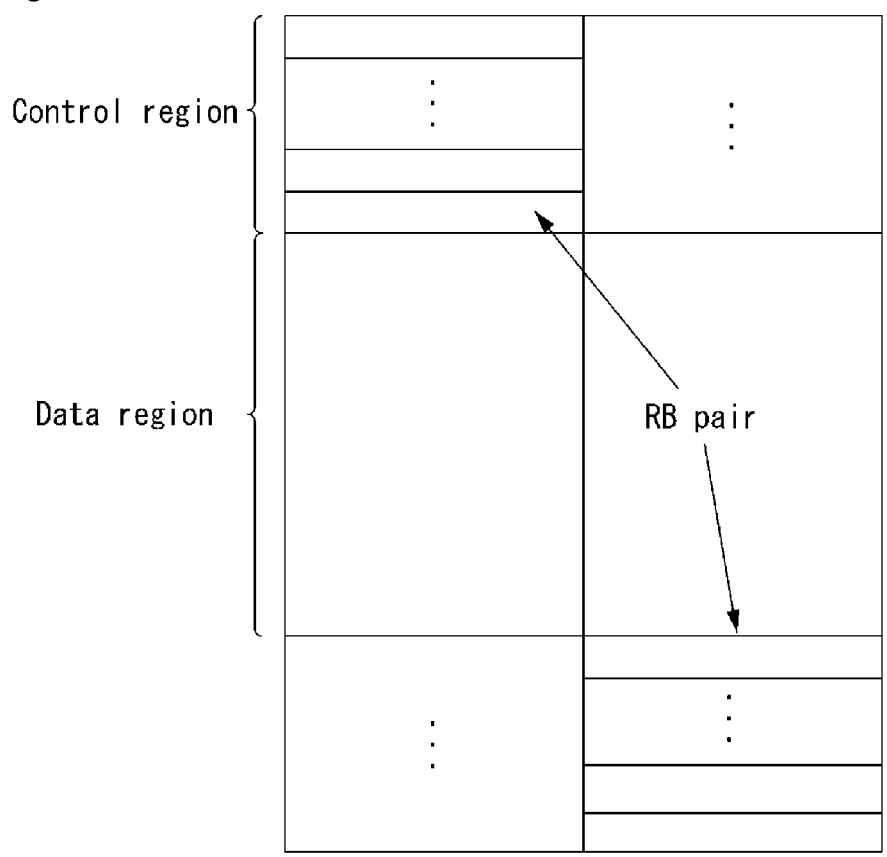
FIG. 4 illustrates a structure of uplink subframe in a wireless communication system to which the present disclosure may be applied.
Figure 4:
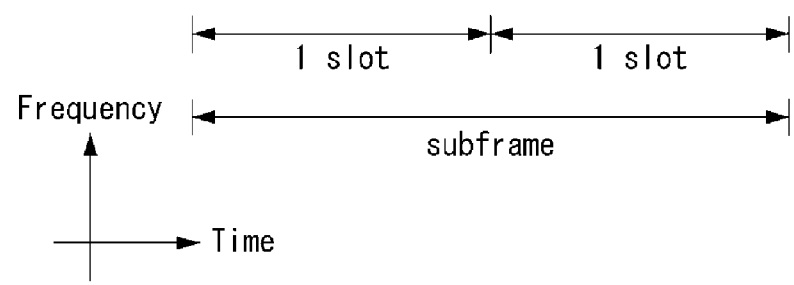

FIG. 4 shows the structure of an uplink subframe in a wireless communication system to which an embodiment of the present disclosure may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
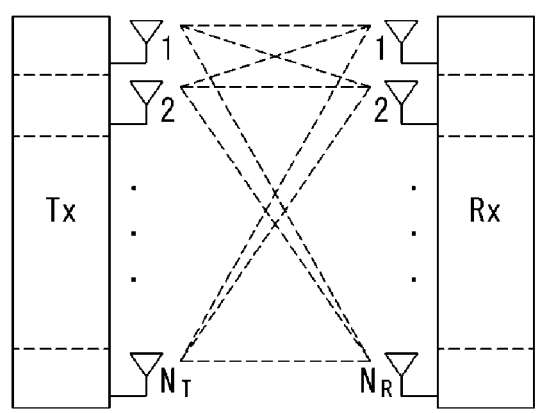
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_N]^T \quad \text{[Equation 2]}$$

Meanwhile, transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, s_{N_T}]^T = [P_1 s_1, P_2 s_2, \ldots, P_{N_T} s_{N_T}]^T \quad \text{[Equation 3]}$$

Furthermore, transmission information having controlled transmission power in the Equation 3 may be represented as follows using the diagonal matrix P of transmission power.

$$\hat{s} = \begin{bmatrix} p_1 & & & 0 \\ & p_2 & & \\ & & \ddots & \\ 0 & & & p_{N_T} \end{bmatrix} \begin{bmatrix} s_1 \\ s_2 \\ \vdots \\ s_{N_T} \end{bmatrix} = Ps \qquad \text{[Equation 4]}$$

Meanwhile, the information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \qquad \text{[Equation 5]}$$

$$\begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y = [y_1, y_2, \ldots, y_{N_R}]^T \qquad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
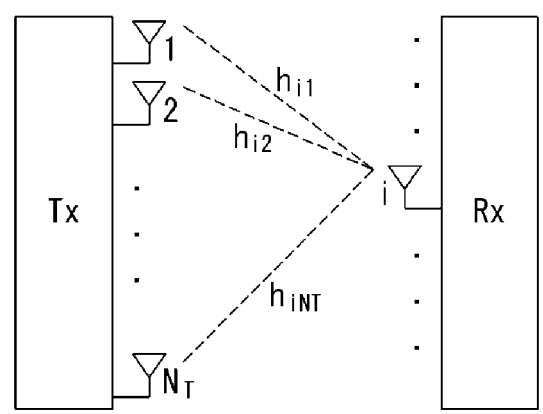
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \qquad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \qquad \text{[Equation 8]}$$

Meanwhile, Additive White Gaussian Noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n = [n_1, n_2, \ldots, n_{N_R}]^T \qquad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \qquad \text{[Equation 10]}$$

$$\begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \qquad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Hereinafter, in relation to the MIMO transport techniques described above, a codebook-based precoding technique will be described in detail.

Figure 7:
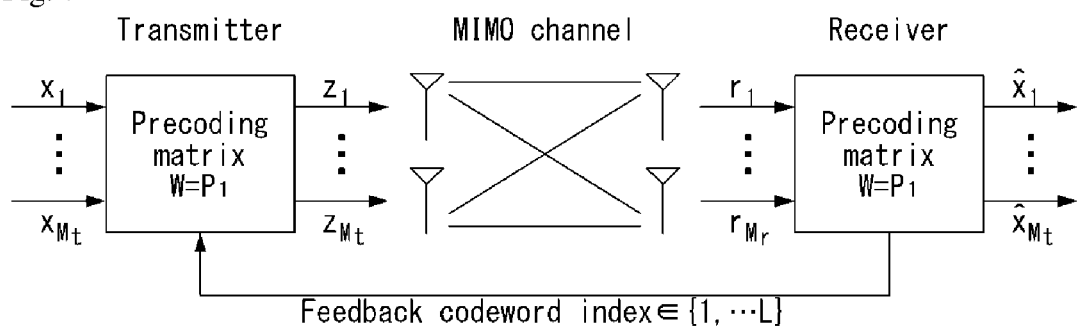
FIG. 7 is a diagram for describing a basic concept of a codebook-based precoding in a wireless communication system to which the present disclosure may be applied.

FIG. 7 is a diagram for describing a basic concept of a codebook-based precoding in a wireless communication system to which the present disclosure may be applied.

According to the codebook-based precoding technique, a transmitting-end and a receiving end share codebook information that includes a predetermined number of precoding matrixes according to a transmission rank, the number of antennas, and so on.

That is, in the case that feedback information is finite, the precoding-based codebook technique may be used.

A receiving-end may measure a channel state through a receiving signal, and may feedback a finite number of preferred matrix information (i.e., index of the corresponding precoding matrix) based on the codebook information described above. For example, a receiving-end may measure a signal in Maximum Likelihood (ML) or Minimum Mean Square Error (MMSE) technique, and may select an optimal precoding matrix.

FIG. 7 shows that a receiving-end transmits the precoding matrix information for each codeword to a transmitting-end, but the present disclosure is not limited thereto.

The transmitting-end that receives the feedback information from the receiving-end may select a specific precoding matrix from the codebook based on the received information. The transmitting-end that selects the precoding matrix may perform precoding in a manner of multiplying layer signals, of which number amounts to a transmission rank, by the selected precoding matrix and may transmit the precoded transmission signal via a plurality of antennas. The number of rows in a precoding matrix is equal to the number of antennas, while the number of columns is equal to a rank value. Since the rank value is equal to the number of layers, the number of the columns is equal to the number of the layers. For instance, when the number of transmitting antennas and the number of layers are 4 and 2, respectively, a precoding matrix may include 4×2 matrix. Equation 12 below represents an operation of mapping information mapped to each layer to a respective antenna through the precoding matrix in the case.

$$\begin{bmatrix} y_1 \\ y_2 \\ y_3 \\ y_4 \end{bmatrix} = \begin{bmatrix} p_{11} & y_1 \\ p_{12} & y_1 \\ p_{13} & y_1 \\ p_{14} & y_1 \end{bmatrix} \cdot \begin{bmatrix} x_1 \\ x_2 \end{bmatrix}$$ [Equation 12]

Referring to Equation 12, information mapped to a layer includes x1 and x2 and each element pij of 4×2 matrix is a weight used for precoding. y1, y2, y3 and y4 indicate information mapped to antennas and may be transmitted via corresponding antennas by OFDM transmission schemes, respectively.

The receiving-end that receives the signal precoded and transmitted in the transmitting-end may reconstruct the received signal by performing inverse processing of the precoding performed in the transmitting-end. Generally, since a precoding matrix satisfies such a unitary matrix (U) condition as 'U*UH=I' (herein, U^H means an Hermit matrix of matrix U), the above-mentioned inverse processing of the precoding may be performed in a manner of multiplying the received signal by Hermit matrix PH of the precoding matrix P used for the precoding performed by the transmitting-end.

In addition, since the precoding is requested to have good performance for antenna configurations of various types, it may be necessary to consider performance for various antenna configurations in codebook design. In the following description, an exemplary configuration of multiple antennas is explained.

In the conventional 3GPP LTE system (e.g., system according to 3GPP LTE Release-8 or Release-9 Standard), since maximum four transmission antennas are supported in DL, a codebook for four transmission antennas is designed. In the 3GPP LTE-A system evolved from the conventional 3GPP LTE system, maximum eight transmission antennas may be supported in DL. Accordingly, it may be necessary to design a precoding codebook that provides good performance for a DL transmission via maximum eight transmission antennas.

Moreover, when a codebook is designed, generally required are constant modulus property, finite alphabet, restriction on a codebook size, nested property, and providing good performance for various antenna configurations.

The constant modulus property means a property that amplitude of each channel component of a precoding matrix configuring a codebook is constant. According to this property, no matter what kind of a precoding matrix is used, power levels transmitted from all antennas may be maintained equal to each other. Hence, it may be able to raise efficiency in using a power amplifier.

The finite alphabet means to configure precoding matrixes using quadrature phase shift keying (QPSK) alphabet (i.e., ±1, ±j) only except a scaling factor in the case of two transmitting antennas, for example. Accordingly, when multiplication is performed on a precoding matrix by a precoder, it may alleviate the complexity of calculation.

The codebook size may be restricted as a predetermined size or smaller. Since a size of a codebook increases, precoding matrixes for various cases may be included in the codebook, and accordingly, a channel status may be more accurately reflected. However, the number of bits of a precoding matrix indicator (PMI) correspondingly increases to cause signaling overhead.

The nested property means that a portion of a high rank precoding matrix is configured with a low rank precoding matrix. Thus, when the corresponding precoding matrix is configured, an appropriate performance may be guaranteed even in the case that a BS determines to perform a DL transmission of a transmission rank lower than a channel rank indicated by a rank indicator (RI) reported from a UE. In addition, according to this property, complexity of channel quality information (CQI) calculation may be reduced. This is because calculation for a precoding matrix selection may be shared in part when an operation of selecting a precoding matrix from precoding matrixes designed for different ranks is performed.

Providing good performance for various antenna configurations may mean that providing performance over a predetermined level is required for various cases including a low correlated antenna configuration, a high correlated antenna configuration, a cross-polarized antenna configuration and the like.

Massive MIMO

A MIMO system having multiple antennas may be referred to as a massive MIMO system and attracts attention as a system for improving spectral efficiency and energy efficiency and reducing processing complexity.

Recently, the massive MIMO system is under discussion in 3GPP in order to satisfy requirements for spectral efficiency of future mobile communication systems. Massive MIMO is also referred to as full-dimension MIMO.

In wireless communication systems following LTE release-12, introduction of an active antenna system (AAS) is considered.

Distinguished from conventional passive antenna systems in which amplifiers capable of adjusting signal phases and levels are separated from antennas, the AAS is configured such that each antenna includes an active element such as an amplifier.

The AAS does not require additional cables, connectors and hardware for connecting amplifiers and antennas because it uses active antennas and thus has high efficiency in terms of energy and operation costs. Particularly, since the AAS supports electronic beam control for each antenna, it enables enhanced MIMO technology such as accurate beam pattern formation or 3-dimensional beam pattern formation in consideration of beam directions and beam widths.

According to introduction of an enhanced antenna system such as the AAS, a massive MIMO structure having multiple input/output antennas and a multi-dimensional antenna structure is also considered. For example, when a 2-dimensional (2D) antenna array is formed, distinguished from a conventional linear antenna array, a 3-dimensional beam pattern can be formed using active antennas of the AAS.

Figure 8:
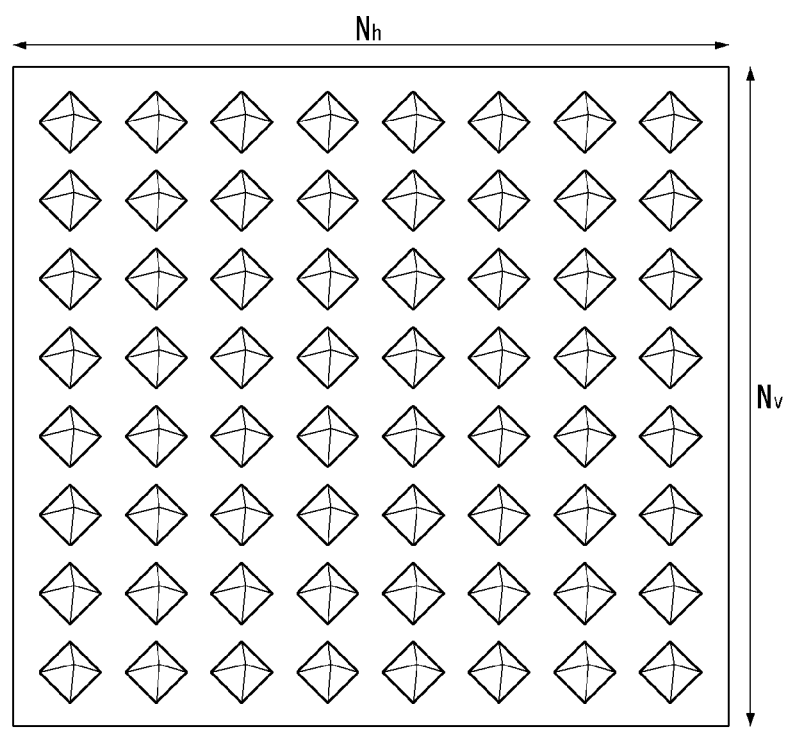
FIG. 8 illustrates a 2-dimensional active antenna system including 64 antenna elements in a wireless communication system to which the present disclosure is applicable.

FIG. 8 illustrates a 2D active antenna system including 64 antenna elements in a wireless communication system to which the present disclosure is applicable.

FIG. 8 illustrates a general 2D antenna array, and a case in which N_t=N_v·N_h antennas have a square shape may be conceived as shown in FIG. 8. Here, N_h represents the number of antenna rows in the horizontal direction and N_v represents the number of antenna columns in the vertical direction.

When such a 2D antenna array is used, radio waves can be controlled in both the vertical direction (elevation) and the horizontal direction (azimuth) such that transmitted beams can be controlled in a 3D space. This type of wavelength control mechanism may be referred to as 3D beamforming.

Figure 9:
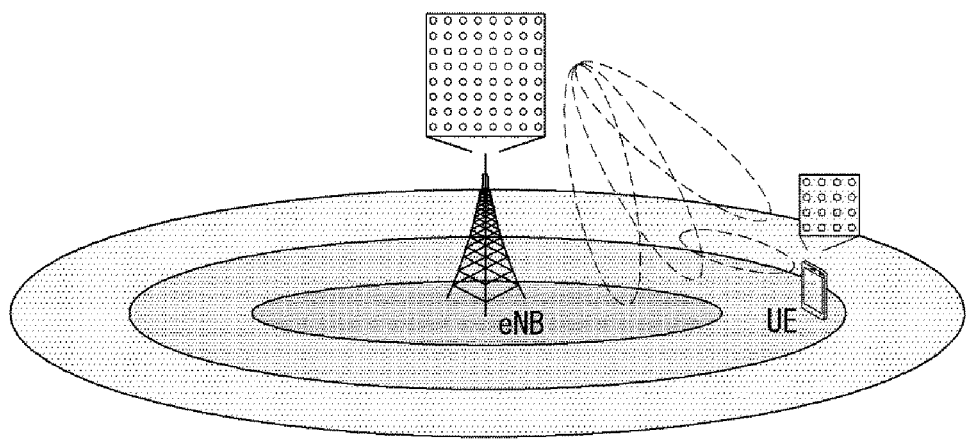
FIG. 9 illustrates a system in which an eNB or a UE includes multiple transmission/reception antennas capable of forming AAS based 3D beams in a wireless communication system to which the present disclosure is applicable.

FIG. 9 illustrates a system in which an eNB or a UE includes multiple transmission/reception antennas capable of forming AAS based 3D beams in a wireless communication system to which the present disclosure is applicable.

FIG. 9 schematically illustrates the above-described example and shows a 3D MIMO system using a 2D antenna array (i.e., 2D-AAS).

When the aforementioned 3D beam pattern from the viewpoint of transmission antennas, quasi-static or dynamic beam formation in the vertical direction as well as the horizontal direction of beams can be performed and, for example, application of sector formation in the vertical direction can be considered.

In addition, when reception beams are formed using massive reception antennas from the viewpoint of reception antennas, a signal power increase effect according to an antenna array gain can be expected. Accordingly, an eNB can receive signals transmitted from a UE through multiple antennas in the case of uplink. Here, the UE can set transmission power thereof to a very low value in consideration of the gain of massive reception antennas in order to reduce the influence of interference.

Figure 10:
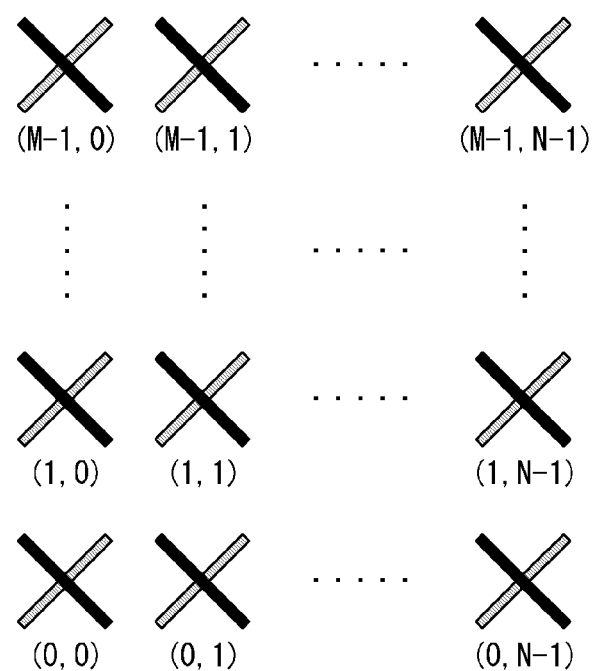
FIG. 10 illustrates a 2-dimensional antenna system having cross polarization in a wireless communication system to which the present disclosure is applicable.

FIG. 10 illustrates a 2D antenna system having cross polarization in a wireless communication system to which the present disclosure is applicable.

A 2D planar antenna array model considering polarization may be schematized as shown in FIG. 10.

Distinguished from a conventional MIMO system using passive antennas, a system based on active antennas can dynamically control gains of antenna elements by applying weights to active elements (e.g., amplifiers) attached to (or included in) the antenna elements. Since a radiation pattern depends on antenna arrangement such as the number of antenna elements and antenna spacing, the antenna system can be modeled at an antenna element level.

The antenna array model as shown in FIG. 10 can be represented as (M, N, P) which corresponds to parameters that characterize the antenna array structure.

M represents the number of antenna elements having the same polarization in each column (i.e., in the vertical direction) (i.e., the number of antenna elements having +45° slant in each column or the number of antenna elements having −45° slant in each column)

N represents the number of columns in the horizontal direction (i.e., the number of antenna elements in the horizontal direction.

P represents the number of dimensions of polarization. While P=2 in the case of cross polarization as in FIG. 10, P=1 in the case of co-polarization.

An antenna port may be mapped to a physical antenna element. An antenna port may be defined by a reference signal related to the antenna port. For example, antenna port 0 may be related to a cell-specific reference signal (CRS) and antenna port 6 may be related to a positioning reference signal (PRS) in an LTE system.

For example, one antenna port may be mapped to one physical antenna element. This may correspond to a case in which a single cross-polarization antenna element is used for MIMO or downlink transmission diversity. For example, antenna port 0 may be mapped to a single physical antenna element whereas antenna port 1 may be mapped to another physical antenna element. In this case, two downlink transmissions are present from the viewpoint of a UE. One is related to a reference signal for antenna port 0 and the other is related to a reference signal for antenna port 1.

As another example, a single antenna port may be mapped to multiple physical antenna elements. This may correspond to a case in which antennas are used for beamforming. Beamforming can cause downlink transmission to be directed to a specific UE using multiple physical antenna elements. This can be achieved using an antenna array including multiple columns of multipole cross-polarization antenna elements, in general. In this case, a single downlink transmission generated from a single antenna port is present from the viewpoint of a UE. One is related to a CRS for antenna port 0 and the other is related to a CRS for antenna port 1.

That is, an antenna port represents downlink transmission from the viewpoint of a UE instead of actual downlink transmission from a physical antenna element in an eNB.

As another example, multiple antenna ports are used for downlink transmission and each antenna port may be mapped to multiple physical antenna elements. This may correspond to a case in which an antenna array is used for downlink MIMO or downlink diversity, and the like. For example, each of antenna ports 0 and 1 may be mapped to multiple physical antenna elements. In this case, two downlink transmissions are present from the viewpoint of a UE. One is related to a reference signal for antenna port 0 and the other is related to a reference signal for antenna 1.

In FD-MIMO, MIMO precoding of data streams may be subjected to antenna port virtualization, transceiver unit (or transmission/reception unit) (TXRU) virtualization and an antenna element pattern.

According to antenna port virtualization, streams on antenna ports are precoded on TXRU. According to TXRU virtualization, TXRU signals are precoded on antenna elements. According to the antenna element pattern, signals radiated from antenna elements may have a directional gain pattern.

In conventional transceiver modeling, static one-to-one mapping between antenna ports and TXRUs is assumed and TXRU virtualization effects are summed as a static (TXRU) antenna pattern including both effects of the TXRU virtualization and antenna element pattern.

Antenna port virtualization may be performed through a frequency-selective method. An antenna port is defined along with a reference signal (or pilot) in LTE. For example, for transmission of data precoded on an antenna port, a DMRS is transmitted in the same bandwidth as that for a data signal and both the DMRS and data are precoded through the same precoder (or precoded through the same TXRU virtualization precoding). For CSI measurement, a CSI-RS is transmitted through multiple antenna ports. In CSI-RS transmission, a precoder which characterizes mapping between CSI-RS ports and TXRUs may be designed as a unique matrix such that a UE can estimate a TXRU virtualization precoding matrix for a data precoding vector.

For a TXRU virtualization method, 1D TXRU virtualization and 2D TXRU virtualization are discussed which will be described below with reference to the drawing.

Figure 11:
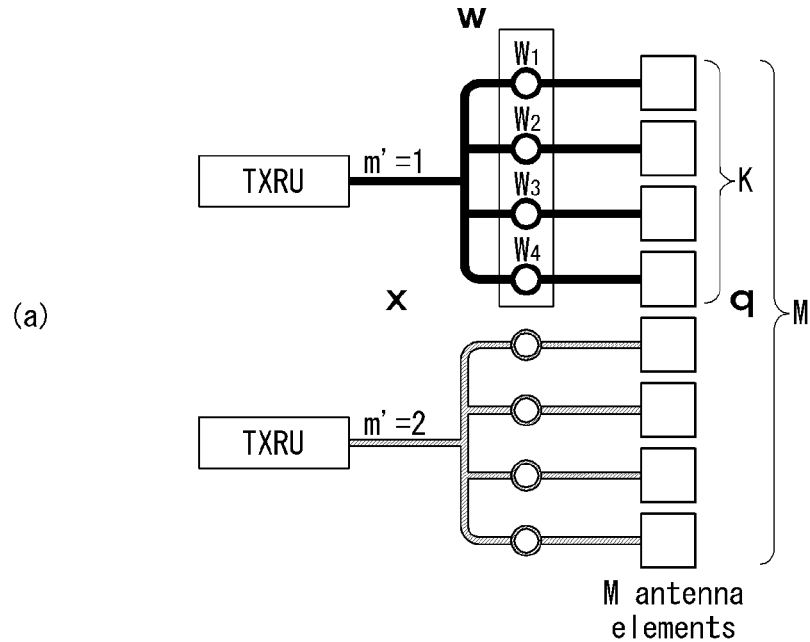
FIG. 11 illustrates a transceiver unit model in in a wireless communication system to which the present disclosure is applicable.
Figure 11:
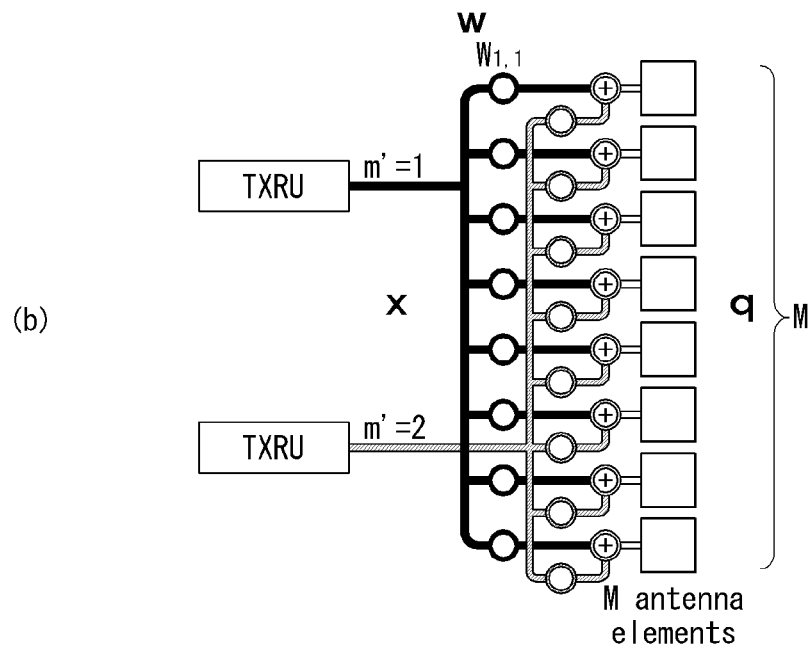

FIG. 11 illustrates a transceiver unit model in a wireless communication system to which the present disclosure is applicable.

In 1D TXRU virtualization, M_TXRU TXRUs are related to M antenna elements having the same polarization which are configured in an antenna array in a single column.

2D TXRU virtualization, a TXRU model configuration corresponding to the antenna array model configuration (M, N, P) of FIG. 10 may be represented as (M_TXRU, N, P). Here, M_TXRU represents the number of 2D TXRUs in the same column and same polarization and M_TXRU≤M all the times. That is, a total number of TXRUs is M_TXRU× N×P.

TXRU virtualization models may be classified into TXRU virtualization model option-1: sub-array partition model, as shown in FIG. 11(a), and TXRU virtualization model option-2: full-connection model, as shown in FIG. 11(b), according to correlation between antenna elements and TXRUs.

Referring to FIG. 11(a), in the case of the sub-array partition model, antenna elements are divided into multiple antenna element groups and each TXRU is connected to one of the groups.

Referring to FIG. 11(b), in the case of the full-connection model, signals of multiple TXRUs are combined and transmitted to a single antenna element (or antenna element array).

In FIG. 11, q is a transmission signal vector of M co-polarized antenna elements in a column. W is a wideband TXRU virtualization weight vector, and W is a wideband TXRU virtualization weight matrix. X is a signal vector of M_TXRU TXRUs.

Here, antenna ports may be 1-to-1 or 1-to-many mapped to TXRUs.

FIG. 11 shows an example of TXRU-to-antenna element mapping and the present disclosure is not limited thereto. The present disclosure can be equally applied to mapping between TXRUs and antenna elements which may be implemented in various other forms from the viewpoint of hardware.

OFDM Numerology

As a larger number of communication devices require larger communication capacity, there is a need for enhanced mobile broadband communication evolving from legacy RAT (Radio Access Technology). Furthermore, massive machine type communication (massive MTC) which provides various services anytime anywhere by connecting multiple devices and things is one of important issues to be considered in future communications. Moreover, communication system design considering services/UEs sensitive to reliability and latency in future communications is under discussion. In this manner, introduction of future RAT considering enhanced mobile broadband communication, massive MTC, URLLC (Ultra-Reliable and Low Latency Communication), etc. is discussed and such technologies may be collectively called "new RAT (NR)".

Hereinafter, a radio access network to which NR is applied may be referred to as NG-RAN (New Generation-RAN) or gNB which may be referred to as an eNB in the specification.

Self-Contained Subframe Structure

Figure 12:
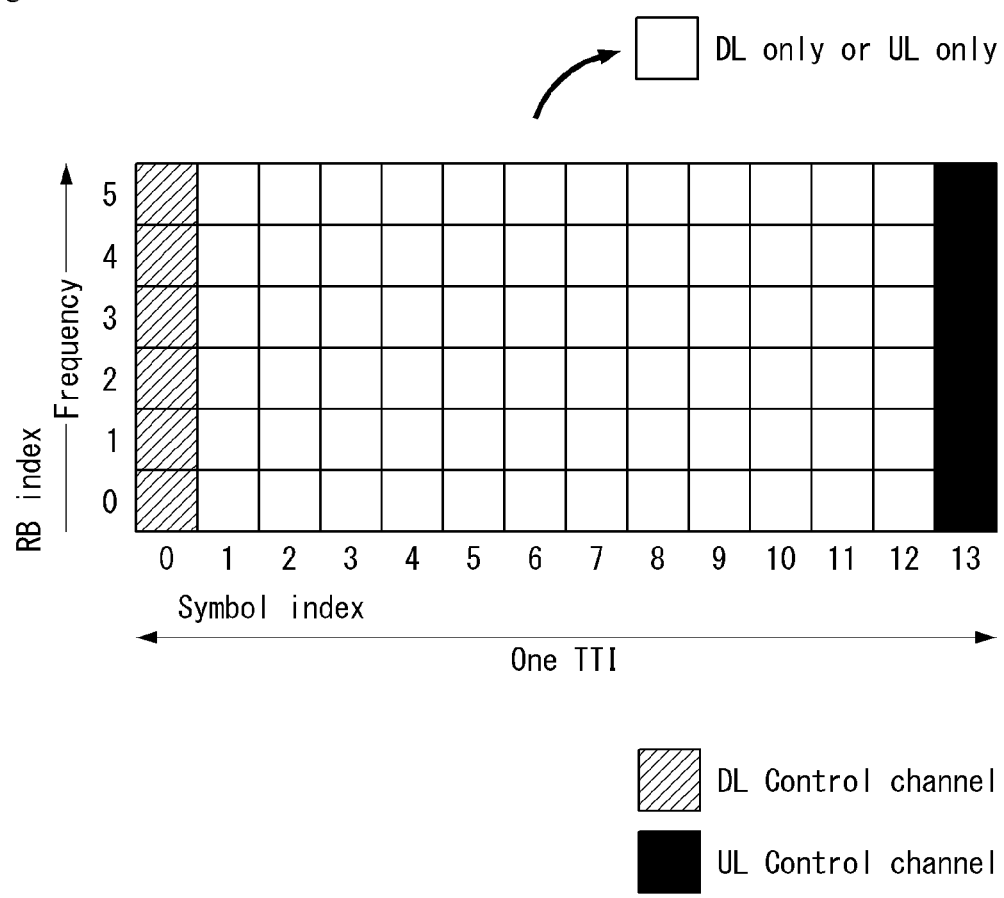
FIG. 12 illustrates a self-contained subframe structure in in a wireless communication system to which the present disclosure is applicable.

To minimize data transmission latency in a TDD system, a self-contained subframe structure in which a control channel and a data channel are time-division-multiplexed (TDM) is considered in 5G new RAT, as shown in FIG. 12.

FIG. 12 illustrates a self-contained subframe structure in a wireless communication system to which the present disclosure is applicable.

In FIG. 12, a shaded region represents a transmission region for a physical channel (e.g., a PDCCH) for DCI transmission and a black region represents a transmission region for a physical channel (e.g., a PUCCH) for UCI (Uplink Control Information) transmission.

Control information transmitted from an eNB to a UE through DCI may include information about a cell configuration that the UE needs to know, DL specific information such as DL scheduling and/or UL specific information such as UL grant. In addition, control information transmitted from a UE to an eNB through UCI may include an ACK/NACK report of HARQ for DL data, a CSI report for a DL channel state and/or a scheduling request (SR).

In FIG. 12, a blank region may be used as a transmission region for a physical channel (e.g., a PDSCH) for downlink data or used as a transmission region for a physical channel (e.g., a PUSCH) for uplink data. This structure has the characteristic that DL transmission and UL transmission are sequentially performed in a single subframe (SF) such that DL data may be transmitted and UL ACK/NACK may be received in the SF. Therefore, according to this structure, a time required for data retransmission when a data transmission error is generated is reduced and thus final data transmission latency can be minimized This self-contained subframe structure requires a time gap for a process in which an eNB and a UE switch from a transmission mode to a reception mode or a process in which the eNB and the UE switch from the reception mode to the transmission. To achieve this, some OFDM symbols at a DL-to-UL switching timing in a subframe structure may be set to a guard period (GP), and this subframe type may be referred to as a "self-contained SF".

Analog Beamforming

In millimeter waves (mmW), a large number of antenna elements can be installed in the same area due to a short wavelength. That is, the wavelength at 30 GHz is 1 cm and thus a total of 64 (8×8) antenna elements can be installed in a 2D array at intervals of 0.5λ (i.e., wavelength) on a 5×5 cm (or 5 by 5 cm) panel. Accordingly, coverage or throughput is enhanced in mmW by increasing a beamforming (BF) gain using multiple antenna elements.

In this case, if TXRUs (transceiver units) are provided such that transmission power and phase can be controlled for each antenna element, independent beamforming can be performed for each frequency resource. However, installation of TXRUs for approximately 100 antenna elements is not efficient in terms of cost. Accordingly, a method of mapping multiple antenna elements to a single TXRU and controlling beam directions using an analog phase shifter is considered. Such an analog beamforming method may generate only one beam direction over the entire bandwidth and thus frequency selective beamforming cannot be performed.

Hybrid beamforming (BF) having B TXRUs fewer than Q antenna elements may be considered as an intermediate form of digital BF and analog BF. In this case, the number of directions of beams which can be simultaneously transmitted is limited to B or less although it depends on a method of connecting the B TXRUs and the Q antenna elements.

Furthermore, when multiple antennas are used in new RAT, hybrid beamforming which combines digital beamforming and analog beamforming has emerged. Here, analog beamforming (or radio frequency (RF) beamforming) refers to an operation of performing precoding (or combining) at an RF stage. In hybrid beamforming, a baseband stage and an RF stage respectively perform precoding (or combining) and thus it is possible to achieve a performance close to digital beamforming while reducing the number of RF chains and the number of digital/analog (D/A) (or A/D) converters. For convenience, a hybrid beamforming structure may be represented by N transceiver units (TXRUs) and M physical antennas. Then, digital beamforming for L data layers to be transmitted by a transmitter may be represented by an N-by-L matrix, and N converted digital signals are converted into analog signals through a TXRU and then analog beamforming represented by an M-by-N matrix is applied thereto.

Figure 13:
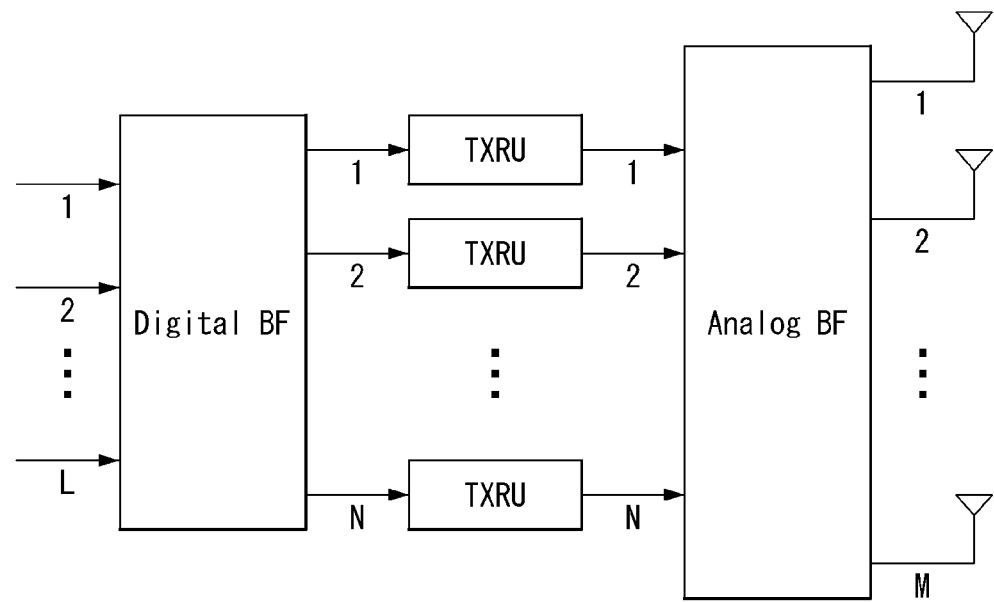
FIG. 13 is a schematic diagram showing a hybrid beamforming structure from the viewpoint of TXRU and physical antennas in in a wireless communication system to which the present disclosure is applicable.

FIG. 13 is a schematic diagram showing a hybrid beamforming structure from the viewpoint of TXRUs and physical antennas in a wireless communication system to which the present disclosure is applicable.

FIG. 13 shows a case in which the number of digital beams is L and the number of analog beams is N In New RAT, supporting more efficient beamforming for a UE located in a specific area by designing an eNB such that the eNB can change analog beamforming in units of symbol is considered. Furthermore, when N TXRUs and M RF antennas are defined as a single antenna panel in FIG. 13, a method of introducing multiple antenna panels to which independent hybrid beamforming operations are applicable is also considered in New RAT.

When an eNB uses multiple analog beams, analog beams suitable signal reception may be different for UEs. Accordingly, a beam sweeping operation of changing multiple analog beams to be applied by an eNB for each symbol in a specific SF for at least a synchronization signal, system information and paging such that all UEs can have a reception opportunity is considered.

Figure 14:
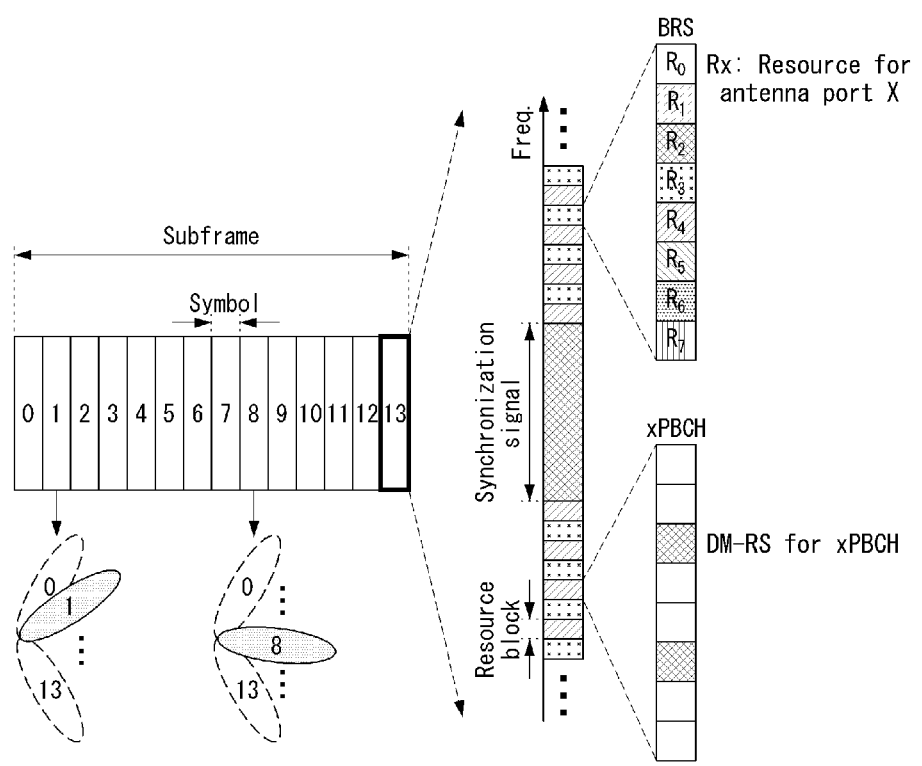
FIG. 14 is a schematic diagram showing a beam sweeping operation for a synchronization signal and system information in a downlink transmission process in in a wireless communication system to which the present disclosure is applicable.

FIG. 14 is a schematic diagram showing a beam sweeping operation for a synchronization signal and system information in a downlink transmission process in a wireless communication system to which the present disclosure is applicable.

In FIG. 14, a physical resource (or physical channel) through which system information of New RAT is transmitted in a broadcasting manner is referred to as xPBCH (physical broadcast channel).

Referring to FIG. 14, analog beams belonging to different antenna panels can be simultaneously transmitted in a single symbol. To measure a channel for each analog beam, a method of introducing a beam reference signal (BRS) that is a reference signal transmitted having a single analog beam (corresponding to a specific antenna panel) applied thereto, as shown in FIG. 14, is under discussion. The BRS may be defined for multiple antenna ports and each antenna port of the BRS may correspond to a single analog beam. Here, distinguished from the BRS, a synchronization signal or xPBCH may be transmitted having all analog beams in an analog beam group applied thereto such that any UE can correctly receive the same.

Radio Resource Management (RRM) Measurement

LTE supports RRM operation for power control, scheduling, cell search, cell re-selection, handover, radio link or connection monitoring, connection establishment/re-establishment, etc. A serving cell may request RRM measurement information that is a measurement value for performing the RRM operation from a UE. Typically, a UE may measure/acquire and report information such as sell search information, reference signal received power (RSRP) and reference signal received quality (RSRQ) for each cell in LTE. Specifically, the UE receives measurement configuration ('measConfig') through higher layer signaling for RRM measurement from the serving cell in LTE. The UE may measure RSRP or RSRQ according to information of the measurement configuration. Here, RSRP, RSRQ and received signal strength indicator (RSSI) according to TX 36.214 of LTE are defined as follows.

1) RSRP

RSRP is defined as the linear average over the power contributions (in [W]) of the resource elements that carry cell-specific reference signals (CRSs) within the considered measurement frequency bandwidth. For RSRP determination, CRS R0 according TS 36.211 [3] shall be used. If the UE can reliably detect that R1 is available, it may use R1 in addition to R0 to determine RSRP.

The reference point for the RSRP shall be the antenna connector of the UE.

If receiver diversity is in use by the UE, the reported value shall not be lower than the corresponding RSRP of any of the individual diversity branches.

2) RSRQ

Reference Signal Received Quality (RSRQ) is defined as the ratio NxRSRP/(E-UTRA carrier RSSI) (i.e., E-UTRA carrier RSSI to NxRSRP), where N is the number of RB's of the E-UTRA carrier RSSI measurement bandwidth. The measurements in the numerator and denominator shall be made over the same set of resource blocks.

E-UTRA Carrier Received Signal Strength Indicator (RSSI) may include the linear average of the total received power (in [W]) observed only in OFDM symbols containing reference symbols for antenna port 0, in the measurement bandwidth, over N number of resource blocks by the UE from all sources (including co-channel serving and nonserving cells) adjacent channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

3) RSSI

RSSI may correspond to broadband power received including thermal noise and noise generated in a receiver in a bandwidth defined by a receiver pulse shaping filter.

The received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

According to the above-described definition, a UE operating in LTE can be allowed to measure RSRP in a bandwidth corresponding to one of 6, 15, 25, 50, 75 and 100 resource blocks (RBs) through permitted measurement bandwidth related information elements (IEs) transmitted in SIB3 (system information block type 3) in the case of intra-frequency measurement and through a permitted measurement bandwidth transmitted in SIB5 (system information block type 5) in the case of inter-frequency measurement. When the aforementioned IEs are not present, the UE can perform measurement in the frequency band of the entire DL system by default. Here, when the UE receives an allowed measurement bandwidth, the UE can regard a corresponding value as a maximum measurement bandwidth and freely measure an RSRP value within the corresponding bandwidth/value. However, when a serving cell transmits IEs defined with WB (wideband)-RSRQ and sets an allowed measurement bandwidth to 50 RBs or more, the UE needs to calculate an RSRP value for the entire allowed measurement bandwidth. Meanwhile, an RSSI can be measured in a frequency band of a receiver of a UE according to RSSI bandwidth definition.

Figure 15:
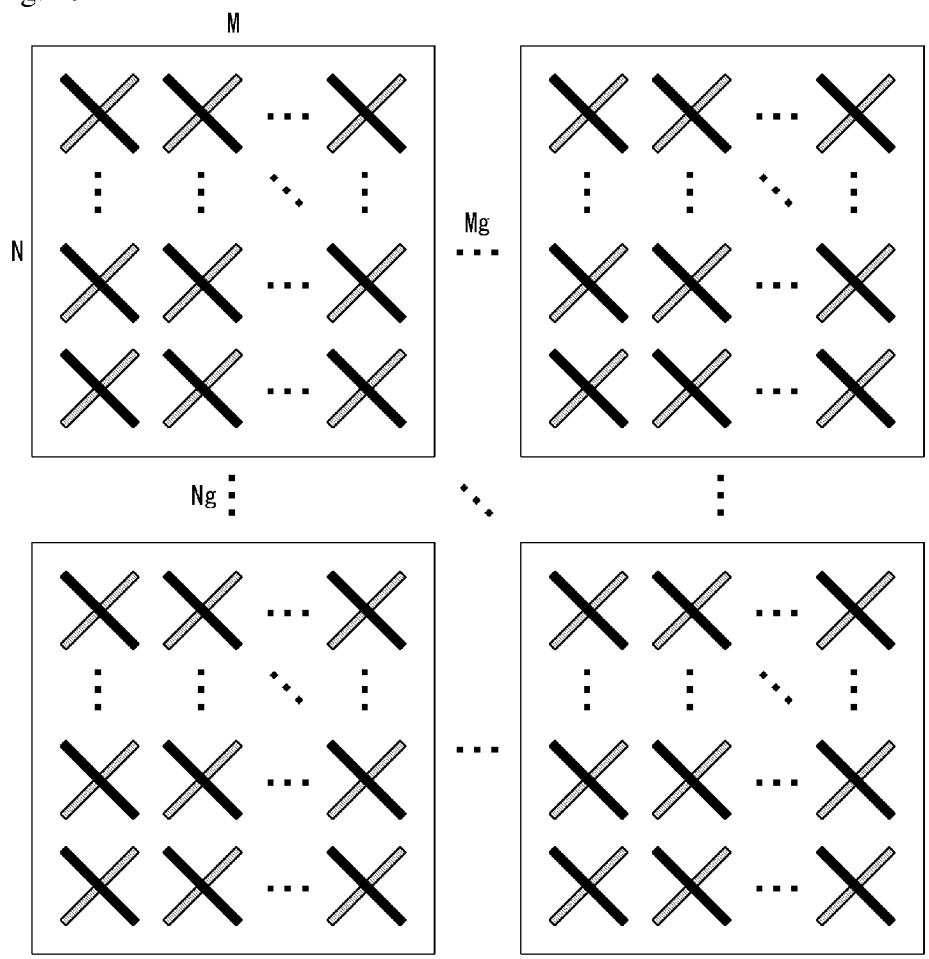
FIG. 15 illustrates a panel antenna array to which the present disclosure is applicable.

FIG. 15 illustrates a panel antenna array applicable to the present disclosure.

Referring to FIG. 15, the panel antenna array may include Mg panels in the horizontal domain and Ng panels in the vertical domain and each panel may include M columns and N rows. Particularly, panels are illustrated on the basis of X-pol (cross polarization) in this figure. Accordingly, a total number of antenna elements may be 2*M*N*Mg*Ng in FIG. 15.

Uplink Codebook

Hereinafter, an uplink codebook defined in LTE(-A) is exemplified.

Table 3 shows a codebook for transmission on antenna ports {20, 21}.

TABLE 3

| Codebook index | Number of layers | |
|---|---|---|
| | $\upsilon = 1$ | $\upsilon = 2$ |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | — |
| 2 | $\frac{1}{\sqrt{2}}\begin{bmatrix}1\\j\end{bmatrix}$ | — |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | — |
| 5 | $\frac{1}{\sqrt{2}}\begin{bmatrix}0\\1\end{bmatrix}$ | — |

Table 4 shows a codebook for transmission of a single layer (v=1) on antenna ports 140, 41, 42, 431.

TABLE 4

| Codebook index | Number of layers ($\upsilon = 1$) |
|---|---|
| 0-7 | $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ |
| 8-15 | $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ |
| 16-23 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ |

Table 5 illustrates a codebook for transmission of two layers (v=2) on antenna ports 140, 41, 42, 431.

TABLE 5

| Codebook index | Number of layers (v = 2) | | | |
|---|---|---|---|---|
| 0-3 | $\frac{1}{2}\begin{bmatrix} 1 & 0 \\ 1 & 0 \\ 0 & 1 \\ 0 & -j \end{bmatrix}$ | $\frac{1}{2}\begin{bmatrix} 1 & 0 \\ 1 & 0 \\ 0 & 1 \\ 0 & j \end{bmatrix}$ | $\frac{1}{2}\begin{bmatrix} 1 & 0 \\ -j & 0 \\ 0 & 1 \\ 0 & 1 \end{bmatrix}$ | $\frac{1}{2}\begin{bmatrix} 1 & 0 \\ -j & 0 \\ 0 & 1 \\ 0 & -1 \end{bmatrix}$ |
| 4-7 | $\frac{1}{2}\begin{bmatrix} 1 & 0 \\ -1 & 0 \\ 0 & 1 \\ 0 & -j \end{bmatrix}$ | $\frac{1}{2}\begin{bmatrix} 1 & 0 \\ -1 & 0 \\ 0 & 1 \\ 0 & j \end{bmatrix}$ | $\frac{1}{2}\begin{bmatrix} 1 & 0 \\ j & 0 \\ 0 & 1 \\ 0 & 1 \end{bmatrix}$ | $\frac{1}{2}\begin{bmatrix} 1 & 0 \\ j & 0 \\ 0 & 1 \\ 0 & -1 \end{bmatrix}$ |
| 8-11 | $\frac{1}{2}\begin{bmatrix} 1 & 0 \\ 0 & 1 \\ 1 & 0 \\ 0 & 1 \end{bmatrix}$ | $\frac{1}{2}\begin{bmatrix} 1 & 0 \\ 0 & 1 \\ 1 & 0 \\ 0 & -1 \end{bmatrix}$ | $\frac{1}{2}\begin{bmatrix} 1 & 0 \\ 0 & 1 \\ -1 & 0 \\ 0 & 1 \end{bmatrix}$ | $\frac{1}{2}\begin{bmatrix} 1 & 0 \\ 0 & 1 \\ -1 & 0 \\ 0 & -1 \end{bmatrix}$ |
| 12-15 | $\frac{1}{2}\begin{bmatrix} 1 & 0 \\ 0 & 1 \\ 0 & 1 \\ 1 & 0 \end{bmatrix}$ | $\frac{1}{2}\begin{bmatrix} 1 & 0 \\ 0 & 1 \\ 0 & -1 \\ 1 & 0 \end{bmatrix}$ | $\frac{1}{2}\begin{bmatrix} 1 & 0 \\ 0 & 1 \\ 0 & 1 \\ -1 & 0 \end{bmatrix}$ | $\frac{1}{2}\begin{bmatrix} 1 & 0 \\ 0 & 1 \\ 0 & -1 \\ -1 & 0 \end{bmatrix}$ |

Table 6 illustrates a codebook for transmission of two layers (v=3) on antenna ports 40, 41, 42, 431.

| Codebook index | Number of layers (v = 3) | | | |
|---|---|---|---|---|
| 0-3 | $\frac{1}{2}\begin{bmatrix} 1 & 0 & 0 \\ 1 & 0 & 0 \\ 0 & 1 & 0 \\ 0 & 0 & 1 \end{bmatrix}$ | $\frac{1}{2}\begin{bmatrix} 1 & 0 & 0 \\ -1 & 0 & 0 \\ 0 & 1 & 0 \\ 0 & 0 & 1 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ |
| 4-7 | $\frac{1}{2}\begin{bmatrix} 1 & 0 & 0 \\ 0 & 1 & 0 \\ 0 & 0 & 1 \\ 1 & 0 & 0 \end{bmatrix}$ | $\frac{1}{2}\begin{bmatrix} 1 & 0 & 0 \\ 0 & 1 & 0 \\ 0 & 0 & 1 \\ -1 & 0 & 0 \end{bmatrix}$ | $\frac{1}{2}\begin{bmatrix} 0 & 1 & 0 \\ 1 & 0 & 0 \\ 1 & 0 & 0 \\ 0 & 0 & 1 \end{bmatrix}$ | $\frac{1}{2}\begin{bmatrix} 0 & 1 & 0 \\ 1 & 0 & 0 \\ -1 & 0 & 0 \\ 0 & 0 & 1 \end{bmatrix}$ |
| 8-11 | $\frac{1}{2}\begin{bmatrix} 0 & 1 & 0 \\ 1 & 0 & 0 \\ 0 & 0 & 1 \\ 1 & 0 & 0 \end{bmatrix}$ | $\frac{1}{2}\begin{bmatrix} 0 & 1 & 0 \\ 1 & 0 & 0 \\ 0 & 0 & 1 \\ -1 & 0 & 0 \end{bmatrix}$ | $\frac{1}{2}\begin{bmatrix} 0 & 1 & 0 \\ 0 & 0 & 1 \\ 1 & 0 & 0 \\ 1 & 0 & 0 \end{bmatrix}$ | $\frac{1}{2}\begin{bmatrix} 0 & 1 & 0 \\ 0 & 0 & 1 \\ 1 & 0 & 0 \\ -1 & 0 & 0 \end{bmatrix}$ |

Table 7 illustrates a codebook for transmission of two layers (v=4) on antenna ports 140, 41, 42, 431.

TABLE 7

| Codebook index | Number of layers (v = 4) |
|---|---|
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

Codebook-Based Transmission Method

Hereinafter, an antenna port may be mapped to an antenna element according to TXRU virtualization in description of the present disclosure and referred to as a "port" for convenience of description.

Although 1 dimension/domain refers to a horizontal dimension/domain and 2 dimension/domain refers to vertical dimension/domain in a 2D antenna array in description of the present disclosure, the present disclosure is not limited thereto.

In addition, like variables used in mathematical expressions may be denoted by like symbols unless otherwise mentioned and may be equally interpreted in description of the present disclosure.

Furthermore, a beam may be interpreted as a precoding matrix (or a precoding vector or a codeword) for generating the beam and a beam group may be interpreted as a set of precoding matrices (or a set of precoding vectors) in description of the present disclosure.

The present disclosure proposes a method of configuring a high-resolution codebook such as type II of NR in order to improve uplink single user (SU) or multi-user (MU) transmission performance. In addition, the present disclosure proposes a codebook-based uplink (particularly, PUSCH) transmission method using such a codebook.

In NR, a method of configuring a type-I codebook corresponding to a signal panel (SP) (i.e., type-I single-panel codebook) and multi-panel (MP) (i.e., type-I multi-panel codebook) having normal resolution which constitute DL CSI feedback type I and a method of configuring a type-II codebook based on linear combination are defined.

With respect to uplink MIMO transmission, two codebook configuration methods below may be defined.

Type I: Mainly for cyclic prefix (CP)-based OFDM (CP-OFDM) with normal resolution Type I: Mainly for CP-OFDM with high resolution A type-1 codebook has a relatively small resolution codebook size and is mainly used for UL SU-MIMO transmission. A type-II codebook is a high-resolution codebook and is used for UL MU-MIMO transmission or may be set at the request of a UE having a large amount of uplink transmission data. Accordingly, whether a UE will use the type-I codebook or the type-II codebook may be indicated by an eNB. More generally, when there are many codebooks corresponding to a transmitted precoding matrix indictor (TPMI) used for data transmission in NR, an eNB may indicate a codebook to be used by a UE or a subset of a codebook to be used by the UE.

The present disclosure proposes a type-II codebook.

1. Port (Group) Quantization Codebook

The size of a TPMI composed of the aforementioned codebook corresponds to an X-by-R matrix (XxR). Here, X denotes the number of transmission (Tx) ports and R denotes a transmission rank.

First, a 2-port codebook will be described.

A 2-port rank-1 codebook may be configured as represented by Equation 13.

$$w_2^{(1)} = \frac{1}{\sqrt{1+p_1^2}} \begin{bmatrix} 1 \\ p_1 * \exp(j\theta_1) \end{bmatrix} \text{ or } \frac{1}{\sqrt{1+p_1^2}} \begin{bmatrix} p_1 * \exp(j\theta_1) \\ 1 \end{bmatrix} \quad [\text{Equation 13}]$$

In Equation 15, the subscript of $w_2^{(1)}$ denotes the number of ports and the superscript denotes a rank.

$p_1$ is an amplitude coefficient and may be composed of y bits. The value y may be configured by an eNB for a UE or appointed in advance between the eNB and the UE.

As in Equation 15, an amplitude coefficient for a specific antenna port may be predetermined as 1 and an amplitude coefficient $p_1$ for an antenna port other than the specific antenna port may be indicated (determined) as a value relative to 1.

Further, $p_1$ may be designed such that it includes 0 in order to support port (or panel) selection functionality. If the amplitude coefficient is indicated as 2 bits, $\{1, \sqrt{0.5}, \sqrt{0.25}, 0\}$ may be configured, for example.

A UE may report to, an eNB, information about a dynamic range of ports belonging to the UE (or port group-wise, sounding reference signal (SRS) resource-wise or panel-wise dynamic range) and/or information related to granularity (i.e., quantization level) according to power amplifier (PA) configuration through capability signaling. The eNB may set a resolution of $p_1$ in consideration of reporting from the UE and signal the resolution to the UE or the UE may report the preferred resolution of $p_1$ to the eNB during capability signaling.

The codebook proposed above has the characteristic that a codebook coefficient corresponding to each port may have 1 or a non-zero value distinguished from an LTE UL codebook.

$\theta_1$ is a phase component of a port and z bits may be configured to indicate the value $\theta_1$. The value z may also be set by an eNB for a UE or appointed in advance between the eNB and the UE. For example, when z=2, $\{0, 0.5\pi, \pi, 1.5\pi\}$ may be set/applied as $\theta_1$.

Like the amplitude coefficient, a phase coefficient for a specific antenna port may be predetermined as 0 and a phase coefficient $\theta_1$ for an antenna port other than the specific antenna port may be indicated (determined) as a value relative to 0, as represented in Equation 15.

For downlink, a UE may send a request for information about a preferred phase and/or amplitude (e.g., granularity) to an eNB in consideration of computational capability thereof. Further, a codebook may be configured using both or any one factor of the phase and the amplitude. If both are used, different y and z values may be set. If only one is used, y or z may be 0. It is assumed that both factors are used in the specification.

In addition, a 1-bit indicator may be additionally defined to indicate a port having a codebook coefficient of 1. That is, an eNB may additionally indicate which one of the two codebooks in Equation 13 is used to a UE. By extending this, a larger number of bits may be used when a number of antenna ports exceeding 2 is configured for PUSCH transmission of the UE.

Alternatively, in order to reduce TPMI indication signaling overhead, the eNB and the UE may make an appointment in advance such that port #0 is set as a port having the strongest RSRP for a signal (e.g., SRS) transmitted from the UE at the eNB.

Alternatively, information may be indicated to the UE in a considerably longer period than other codebook components (e.g., amplitude and phase) (or semi-statically). In this case, the UE can configure a codebook on the basis of the most recent indication until update of the information is instructed. In addition, an initial default value may be set to a specific port (e.g., port #0) through an appointment between the eNB and the UE or may be predefined as the specific port.

Hereinafter, in description of the present disclosure, a Tx antenna port of a UE may be mapped to an antenna element according to TXRU virtualization and is referred to as a "port" for convenience of description.

For power constraint per port, a normalization factor may be set to $$\frac{1}{\sqrt{2R}}$$

in Equation 13.

Here, although the power constraint per port may also be applied to a codebook according to a proposal of the present disclosure which will be described later even if it is not additionally described, this is omitted for convenience of description.

A rank-2 codebook may be configured by independently applying a rank-1 codebook configuration as represented by Equation 14.

$$w_2^{(2)} = [w_2^{(21)} w_2^{(22)}] \quad [\text{Equation 14}]$$

In Equation 14, each column is normalized into $$\frac{1}{\sqrt{R}}$$

and the superscript of $w_2^{(2i)}$ denotes the i-th layer of R=2.

In the case of 2 ports, when bits for indicating phase and amplitude coefficients are assumed to be 2 bits, signaling overhead is 5 bits (including selection of a port having the strongest RSRP) at rank 1 and corresponds to 10 bits at rank 2 according to the aforementioned design. Since rank 2 is a full rank, signaling overhead can be reduced using a type-I codebook in the case of 2 ports if overhead for optimizing rank 2 is large.

Hereinafter, an X-port codebook (e.g., X=4, 8) will be described.

When 2-port is extended to X-port, it can be generalized as represented by Equation 15.

$$w_X^{(1)} = \frac{1}{\sqrt{1+p_1^2+\cdots+p_{X-1}^2}} \begin{bmatrix} 1 \\ p_1 * \exp(j\theta_1) \\ \vdots \\ p_{X-1} * \exp(j\theta_{X-1}) \end{bmatrix} \quad [\text{Equation 15}]$$

In Equation 15, it can be assumed that $p_n$, $\theta_n$ (n=1, 2, ..., X−1) is independently applied per port.

Although port #0 is represented as a port having the strongest RSRP in Equation 15, information about a port having the strongest RSRP may be additionally indicated using $\lfloor \log_2 X \rfloor$ bits. In the case of rank 2, phase and amplitude components may be independently determined per layer of each port using Equation 14.

When independent quantization is applied per code (or precoder) as represented by Equation 15, a problem that signaling overhead linearly increases may be generated as X increases. To reduce this overhead, a phase vector set and/or an amplitude vector set may be defined/appointed in advance and a quantization method for such factors may be used. In this case, the eNB may signal information indicating a phase vector and/or an amplitude vector selected from the phase vector set and/or the amplitude vector set to the UE through DCI.

For example, when X=4, Equation 15 can be represented as Equation 16 below.

$$v \in \left\{ \begin{bmatrix} 1 \\ 1 \\ 1 \\ 1 \end{bmatrix} \begin{bmatrix} 1 \\ j \\ -1 \\ -j \end{bmatrix} \cdots \begin{bmatrix} 1 \\ 1 \\ j \\ j \end{bmatrix} \right\} \quad \text{[Equation 16]}$$

$$p = \left\{ \begin{bmatrix} 1 \\ 1 \\ 1 \\ 1 \end{bmatrix} \begin{bmatrix} 1 \\ \sqrt{0.5} \\ 1 \\ \sqrt{0.5} \end{bmatrix} \cdots \begin{bmatrix} 1 \\ 1 \\ 1 \\ 0 \end{bmatrix} \right\}$$

$$w_X^{(1)} = norm(v \circ p)$$

In Equation 16, norm( ) refers to column normalization and ° refers to element wise product. In the case of Equation 16, a specific codebook or a subset thereof (e.g., an LTE DL or UL 4Tx codebook or a subset thereof) may be used.

Alternatively, a quantization method may be applied to one of the amplitude and the phase and a previously appointed/predefined vector set may be used for the other factor.

Furthermore, frequency selective precoding is possible in uplink CP-OFDM. In this case, accordingly, factors constituting a codebook may be divided into a wideband (WB) attribute (e.g., W1 of a dual stage codebook) and a subband (SB) attribute (e.g., W2 of a dual stage codebook) and frequency selective precoding may be performed. For example, a UE may be instructed to set/apply WB for selection of a port having the strongest RSRP and an amplitude coefficient (i.e., a port selected over WB is commonly applied) and to set/apply SB for a phase (i.e., a phase individually determined per SB is applied).

Alternatively, the UE may be instructed to set/apply WB for selection of a port having the strongest RSRP and to set/apply SB for amplitude and phase factors.

SB signaling overhead may increase according to the number of SBs. To prevent this, the UE may be instructed to perform SB phase reporting only when a WB power coefficient is equal to or greater than (or exceeds) a specific threshold value (e.g., $p_n$=1) and to use a WB phase for the remaining ports.

Alternatively, signaling overhead may be reduced by configuring an SB phase (and/or amplitude) with granularity less than that of a WB phase (and/or amplitude) (e.g., 2-bit {¼*pi, ¾*pi, ⁵⁄₄*pi, ⁷⁄₄*pi} in the case of WB and 1-bit {−¼*pi, ¼*pi} in the case of SB).

To reduce the size of the codebook proposed in the present disclosure, an eNB may group ports having similar RSRPs in a configured SRS resource and/or SRS-ports having similar phase differences and indicate/signal pattern information thereon to a UE.

In this case, a port grouping size may be independently determined per group. For example, in the case of a 4-port SRS, each group may have ports of (1, 2, 3, 4). However, it may be assumed that respective port groups have the same number of ports in order to minimize signaling with respect to ports. Alternatively, port grouping may be limited to grouping of (2, 2) in the case of 4 ports and limited to grouping of (4, 4) or (2, 2, 2, 2) in the case of 8 ports.

Equation 17 below shows port grouping in the case of 4 ports.

$$\begin{bmatrix} 111 \\ 100 \\ 010 \\ 001 \end{bmatrix} \quad \text{[Equation 17]}$$

In Equation 17, the same numeral indicates the same group in each column, and the eNB may indicate a grouping type to a UE by signaling column information to the UE.

If port grouping configured as in the first column of Equation 18 is indicated to the UE, a codebook may be configured as represented by Equation 18.

$$w_X^{(1)} = \begin{bmatrix} w_{\frac{X}{2},0}^{(1)} \\ p_1 \exp(j\theta_1) w_{\frac{X}{2},1}^{(1)} \end{bmatrix} \quad \text{[Equation 18]}$$

In Equation 18, the subscript j of $$w_{\frac{X}{2},j}^{(1)}$$

denotes a j-th (X/2)-port group. This vector may be calculated by Equation 15 (i.e., codebook configuration independent for each port group $$w_{\frac{X}{2},0}^{(1)} \neq w_{\frac{X}{2},1}^{(1)}).$$

It can be assumed that a port of X/2 which has the strongest RSRP is set to a specific port (e.g., lowest index in a group). Alternatively, to reduce overhead, only quantization is performed on a phase or amplitude component for $$w_{\frac{X}{2},j}^{(1)}$$

in the same group or a common codebook for a port-group may be assumed $$\left(\text{i.e., } w_{\frac{X}{2},0}^{(1)} = w_{\frac{X}{2},1}^{(1)}\right).$$

In Equation 18, the group amplitude index and phase index may be set/applied by a UE as in the above-described method. In the case of rank 2, the amplitude index and phase index may be independently configured per layer according to Equation 14. In the case of a common codebook of a port-group, a Tx antenna of a UE has an X-pol (i.e., cross polarization) structure and optimal performance is expected when preferred amplitudes of all ports are identical or has the same rate, but the common codebook of the port-group can considerably reduce signaling overhead.

In the case of the above-described codebook, a port selection function may also be performed according to whether an amplitude is controlled, and thus the codebook may be used in DFT-s-OFDM (Discrete Fourier transform-spread-OFDM).

2. Linear Combining Codebook

A linear combining codebook sets a PMI by linearly combining X-port beams (precoders) and may be represented by Equation 19.

$$w_X^{(1)} = \frac{1}{\sqrt{1 + p_1^2 \ldots + p_{L-1}^2}}\left(b_0 + \sum_{k=1}^{L-1} p_k \exp(j\theta_k) b_k\right) \quad [\text{Equation 19}]$$

In Equation 19, $p_k$ and $\theta_k$ respectively represent the amplitude coefficient and the phase coefficient as described in the aforementioned port (or port-group) quantization codebook. $b_k$ may correspond to any vector having a length of X. L (herein L is configurable. For example, L=2,3) combined beams (precoders) $\{b_k\}$ are orthogonal. As typical orthogonal code, for example, a DFT (Discrete Fourier transform) matrix, a complex Hadamard matrix (for X=4), an Identity matrix (in this case, Equation 19 may be the same as a port quantization codebook), or the like may be used.

For example, when a complex Hadamard matrix is used, this may be represented by Equation 20 below when X=4.

$$B = \begin{bmatrix} 1 & 1 & 1 & 1 \\ 1 & j\exp(ja) & -1 & -j\exp(ja) \\ 1 & -1 & 1 & -1 \\ 1 & -j\exp(ja) & -1 & j\exp(ja) \end{bmatrix} \text{ where } a \in [0, \pi) \quad [\text{Equation 20}]$$

To improve granularity of a Hadamard matrix, the size of an orthogonal basis set can be increased by setting the value a to multiple values (e.g., a ∈ {0, 0.25π, 0.5π, 0.75π}). This may be regarded as the same as oversampling effect in a DFT matrix. However, although combined elements in a matrix have linear increment and thus are suitable for linear array in the case of a DFT matrix, there are many cases other than linear array in the case of UL and thus it may be advantageous to use more various orthogonal bases.

In the case of oversampled DFT, an m-th column of a DFT matrix having a length of X and oversampled to o is represented by Equation 21.

$$v_m = \left[1 \; \exp\left(j\frac{2\pi m}{oX}\right) \; \cdots \; \exp\left(j\frac{2\pi m(X-1)}{oX}\right)\right]^T \quad [\text{Equation 21}]$$

A set of bases (e.g., type or size) in a linear combining codebook proposed in an embodiment of the present disclosure, which will be used by a UE, may be indicated/set by the eNB to the UE. For example, when the size of a basis is indicated/set to the UE, granularity of an available value of a in Equation 20 may be indicated/set to the UE or an available value of o in Equation 21 may be indicated/set to the UE.

To discover a best orthogonal set, the eNB may discover a vector best matching a given channel or representative information of the channel (e.g., first eigenvector) and then configure a linear combining codebook using an orthogonal set to which the vector belongs.

Since a given X-port uses a vector having a dimension of X, the X-dimension vector can represent the entire span vector space using X orthogonal bases. However, a coefficient combined per beam is present, causing excessive signaling overhead. Accordingly, the eNB may determine a specific threshold value (e.g., a degree of correlation with an eigenvector) for a specific metric and select L beams from among X bases. Information necessary for signaling of the beam selection is $$\binom{X}{L}.$$

The above-described port-group quantization codebook configuration method may be equally used as a method of determining coefficients of combined beams.

Further, if the aforementioned codebook can be applied up to rank 2, configuration of a rank-2 codebook may be indicated by combining Equation 20 and Equation 14 (i.e., using independent amplitude and phase encoding per layer). When it is difficult to find an orthogonal basis as the number of ports increases, X ports may be divided into specific port groups as in the method represented by Equation 18 and a common or independent orthogonal beam set selection may be performed for each port group.

The above-described codebook is characterized in that a codebook coefficient corresponding to each port may be 1 or a non-zero value, distinguished from the LTE UL codebook.

In addition, in the case of the above-described codebook, orthogonality for each layer is not guaranteed even if independent encoding for each layer is performed. Orthogonality for each layer is very important in TPMI. In the case of DL, even if a UE transmits a PMI through a non-orthogonal codebook according to implementation of an eNB, the eNB may perform refinement into orthogonal beamforming according to an MU transmission process and perform data transmission. However, in the case of TPMI, the UE transmits the TPMI according to an instruction of the eNB, and thus serious performance deterioration due to inter-layer interference is expected if the eNB indicates non-orthogonal TPMI for each layer. Accordingly, the eNB signals the codebook to the UE through the aforementioned codebook components, and the UE may indicate whether a previously appointed orthogonalization procedure (e.g., gram-schmidt or QR decomposition: which may be understood to be sequentially applied on the basis of a specific layer, for example, the first layer when the above method is used) is applied to the eNB using additional 1 bit or the orthogonalization procedure may be appointed/predefined as a default behavior of the UE between the eNB and the UE.

Different number of bits or ranges may be used at different transmission times for the purpose of refinement of a phase or an amplitude in the above-described codebooks. As an example in a different range, if the third index is indicated such that $p_n=\sqrt{0.25}$ is used in a set of $p_n=\{1, \sqrt{0.5}, \sqrt{0.25}, 0\}$ at n-th transmission time, the UE may understand that $p_n=\sqrt{0.375}$ is indicated in a set of $p_n=\{\sqrt{0.375}, \sqrt{0.25}, \sqrt{0.125}, 0\}$ when the first index is indicated at (n+1)-th transmission time, for example. When hierarchical quantization is used in this manner, performance gain can be achieved in an environment having little time domain channel variation. Accordingly, the eNB can signal, to the UE, whether the hierarchical quantization is used and/or which quantization set (amplitude, phase range and/or bit width) is used. Although 2 stages have been described in the above example for convenience of description, multi-stage (e.g., 3-stage) refinement may be conceived in order to achieve fine tuning or significantly reduce signaling overhead. With respect to phase, ½π may be selected in set {0, ½π, 2/2π, ³⁄₂π} in the first stage and ¾π in set {0, ¼π, ²⁄₄π, ¾π} may be indicated in the second stage. Furthermore, although the proposed method is time domain refinement, this may be extended to the frequency domain (e.g., refinement from WB to SB) and applied.

In addition, when the above-described codebook is used on DL, the UE may additionally feed back the aforementioned information to the eNB.

3. Higher Rank Design

In the present embodiment, a codebook for low resolution of X=4, 8 and higher ranks (e.g., R=2, 3, 4) is proposed. In the present embodiment, a 2-port (or 4-port) codebook and a method of calculating a higher orthogonal rank by applying an orthogonal cover code thereto are proposed.

First, orthogonal 2-port codebooks are defined as follows.

It is assumed that two codewords $w_2^{(21)}$ and $w_2^{(22)}$ are always column-wise orthogonal. According to such a codebook configuration method, for example, a codebook as represented by Equation 22 may be configured.

$$[w_2^{(21)}, w_2^{(22)}] = \begin{bmatrix} 1 & p_1 \exp(-j\theta_1) \\ p_1 \exp(j\theta_1) & -1 \end{bmatrix} \quad \text{[Equation 22]}$$

$$\text{or } \begin{bmatrix} 1 & 1 \\ \exp(j\theta_1) & -\exp(j\theta_1) \end{bmatrix}$$

When a codebook is configured like the second codebook in Equation 22, the codebook proposed in the present embodiment may also be used in Type I having normal resolution.

A 4-port rank-2 codebook is configured as represented by Equation 23.

$$w_4^{(2)} = \begin{bmatrix} w_2^{(2l)} & w_2^{(2l)} \\ \phi_n w_2^{(2l)} & -\phi_n w_2^{(2l)} \end{bmatrix} (l \text{ is selected within } WB) \text{ or} \quad \text{[Equation 23]}$$

$$w_4^{(2)} = \begin{bmatrix} w_2^{(21)} & w_2^{(22)} \\ \phi_n w_2^{(21)} & -\phi_n w_2^{(22)} \end{bmatrix}$$

In Equation 23, $\phi_n$ is a 2-port group-wise co-phase and WB and/or SB attributes and is {1, j} when it is 1 bit, for example.

Equation 24 represents a 4-port rank 3-4 codebook.

$$w_4^{(3)} = \begin{bmatrix} w_2^{(21)} & w_2^{(21)} & w_2^{(22)} \\ \phi_{n,1} w_2^{(21)} & -\phi_{n,1} w_2^{(21)} & \phi_{n,2} w_2^{(22)} \end{bmatrix} \quad \text{[Equation 24]}$$

$$\text{or } \begin{bmatrix} w_2^{(21)} & w_2^{(22)} & w_2^{(22)} \\ \phi_{n,1} w_2^{(21)} & \phi_{n,2} w_2^{(22)} & -\phi_{n,2} w_2^{(22)} \end{bmatrix}$$

$$w_4^{(4)} = \begin{bmatrix} w_2^{(21)} & w_2^{(21)} & w_2^{(22)} & w_2^{(22)} \\ \phi_{n,1} w_2^{(21)} & -\phi_{n,1} w_2^{(21)} & \phi_{n,2} w_2^{(22)} & -\phi_{n,2} w_2^{(22)} \end{bmatrix}$$

In the case of ranks 3 and 4, the codebook may be configured as represented by Equation 24. Here, $\phi_{n,1}$ is co-phase of the 1-th 2-port codebook and WB and/or SB attributes. For example, it may be applied independently (i.e., value and/or granularity are independently applied) or applied in an integrated manner according to 1 value when it is 1 bit ({1, j}). One of the aforementioned two matrices, which will be used, may be selected by WB and/or SB attributes or selected as one thereof. Since rank 4 is a full rank, a co-phase value may be simply determined as a single value (e.g., $\phi_{n,1}=\phi_{n,2}=1$).

An 8-port rank 2-4 codebook may be configured on the same principle as that of the aforementioned 4-port design by replacing $w_2^{(2l)}$ in the 4-port design by $w_4^{(4l)}$ Hereinafter, a method of configuring an 8-port codebook with a higher rank on the basis of 2 ports in order to improve granularity will be described. In this case, the complex Hadamard code of Equation 20 may be considered. Here, a method of configuring $w_2^{(2l)}$ is indicated as WB attribute.

$$w_8^{(2)} = \begin{bmatrix} w_2^{(2l)} & w_2^{(2l)} \\ w_2^{(2l)} & j\exp(ja)w_2^{(2l)} \\ w_2^{(2l)} & w_2^{(2l)} \\ w_2^{(2l)} & -j\exp(ja)w_2^{(2l)} \end{bmatrix} \quad \text{[Equation 25]}$$

$$\text{or } \begin{bmatrix} w_2^{(2l)} & w_2^{(2l)} \\ w_2^{(2l)} & -w_2^{(2l)} \\ w_2^{(2l)} & w_2^{(2l)} \\ w_2^{(2l)} & -w_2^{(2l)} \end{bmatrix} \text{ or } \begin{bmatrix} w_2^{(2l)} & w_2^{(2l)} \\ w_2^{(2l)} & -j\exp(ja)w_2^{(2l)} \\ w_2^{(2l)} & -w_2^{(2l)} \\ w_2^{(2l)} & j\exp(ja)w_2^{(2l)} \end{bmatrix}$$

$$\text{or or } \begin{bmatrix} w_2^{(2l)} & w_2^{(2l)} \\ j\exp(ja)w_2^{(2l)} & -w_2^{(2l)} \\ w_2^{(2l)} & w_2^{(2l)} \\ -j\exp(ja)w_2^{(2l)} & -w_2^{(2l)} \end{bmatrix}$$

$$\text{or } \begin{bmatrix} w_2^{(2l)} & w_2^{(2l)} \\ j\exp(ja)w_2^{(2l)} & -j\exp(ja)w_2^{(2l)} \\ w_2^{(2l)} & -w_2^{(2l)} \\ -j\exp(ja)w_2^{(2l)} & j\exp(ja)w_2^{(2l)} \end{bmatrix}$$

$$\text{or } \begin{bmatrix} w_2^{(2l)} & w_2^{(2l)} \\ -w_2^{(2l)} & -j\exp(ja)w_2^{(2l)} \\ w_2^{(2l)} & -w_2^{(2l)} \\ -w_2^{(2l)} & j\exp(ja)w_2^{(2l)} \end{bmatrix}$$

In the case of rank 2, which matrix from among six candidates as represented by Equation 25 or subsets thereof will be used may be selected by WB or SB. The attribute of value a is selected as SB and/or WB attributes, and thus frequency selective precoding may be selected (e.g., a={0 0.5pi}). Further, in the case of WB+SB indication, the value a may be indicated with different granularities for effective indication.

$$w_8^{(3)} = \begin{bmatrix} w_2^{(2l)} & w_2^{(2l)} & w_2^{(2l)} \\ w_2^{(2l)} & j\exp(ja)w_2^{(2l)} & -w_2^{(2l)} \\ w_2^{(2l)} & -w_2^{(2l)} & w_2^{(2l)} \\ w_2^{(2l)} & -j\exp(ja)w_2^{(2l)} & -w_2^{(2l)} \end{bmatrix}$$ [Equation 26]

$$\text{or} \begin{bmatrix} w_2^{(2l)} & w_2^{(2l)} & w_2^{(2l)} \\ w_2^{(2l)} & j\exp(ja)w_2^{(2l)} & -j\exp(ja)w_2^{(2l)} \\ w_2^{(2l)} & w_2^{(2l)} & -w_2^{(2l)} \\ w_2^{(2l)} & -j\exp(ja)w_2^{(2l)} & j\exp(ja)w_2^{(2l)} \end{bmatrix}$$

$$\text{or} \begin{bmatrix} w_2^{(2l)} & w_2^{(2l)} & w_2^{(2l)} \\ j\exp(ja)w_2^{(2l)} & -w_2^{(2l)} & -j\exp(ja)w_2^{(2l)} \\ -w_2^{(2l)} & w_2^{(2l)} & -w_2^{(2l)} \\ -j\exp(ja)w_2^{(2l)} & -w_2^{(2l)} & j\exp(ja)w_2^{(2l)} \end{bmatrix}$$

In the case of rank 3, which matrix from among three candidates as represented by Equation 26 or subsets thereof will be used may be selected by WB or SB. The attribute of value a is selected as SB and/or WB attributes, and thus frequency selective precoding may be selected (e.g., a={0 0.5pi}). Further, in the case of WB+SB indication, the value a may be indicated with different granularities for effective indication.

$$w_8^{(4)} = \begin{bmatrix} w_2^{(2l)} & w_2^{(2l)} & w_2^{(2l)} & 1 \\ w_2^{(2l)} & j\exp(ja)w_2^{(2l)} & -w_2^{(2l)} & -j\exp(ja)w_2^{(2l)} \\ w_2^{(2l)} & -w_2^{(2l)} & w_2^{(2l)} & -w_2^{(2l)} \\ w_2^{(2l)} & -j\exp(ja)w_2^{(2l)} & -w_2^{(2l)} & j\exp(ja)w_2^{(2l)} \end{bmatrix}$$ [Equation 27]

In the case of rank 4, the attribute of value a is selected as SB and/or WB attributes, and thus frequency selective precoding may be selected (e.g., a={0 0.5pi}). Further, in the case of WB+SB indication, the value a may be indicated with different granularities for effective indication.

In the above-described rank 2-4 configuration methods, codebooks may be configured using different versions of the complex hadamard matrix or different 4-by-4 orthogonal cover codes.

When only the above-described codebook configuration method is considered, only the phase of a specific port can be controlled. To solve this problem and increase codebook resolution, a method of multiplying a row-wise permutation matrix may be used.

That is, the front parts of the aforementioned codebooks $w_8^{(3)}$ and $w_8^{(4)}$ are multiplied by a row-wise permutation matrix P as represented by Equation 28 (or a subset thereof) such that $Pw_8^{(3)}$ and $Pw_8^{(4)}$ can be used as codebooks. Here, the factor P may be indicated by WB or SB. Alternatively, which permutation will be used may be additionally indicated to a UE, and the UE which has received this indication may operate to apply the indicated column P to a codebook all the time.

$$P \in \left\{ \begin{bmatrix} 1 & 0 & 0 & 0 \\ 0 & 1 & 0 & 0 \\ 0 & 0 & 1 & 0 \\ 0 & 0 & 0 & 1 \end{bmatrix}, \begin{bmatrix} 1 & 0 & 0 & 0 \\ 0 & 0 & 1 & 0 \\ 0 & 1 & 0 & 0 \\ 0 & 0 & 0 & 1 \end{bmatrix}, \begin{bmatrix} 1 & 0 & 0 & 0 \\ 0 & 1 & 0 & 0 \\ 0 & 0 & 0 & 1 \\ 0 & 0 & 1 & 0 \end{bmatrix}, \begin{bmatrix} 1 & 0 & 0 & 0 \\ 0 & 1 & 0 & 0 \\ 0 & 0 & 0 & 1 \\ 0 & 0 & 1 & 0 \end{bmatrix} \right\}$$ [Equation 28]

In the case of ranks 5 to 8 codebook, an orthogonal 4-port codebook as represented by Equation 29 can be used. Here, codewords $w_4^{(41)}$, $w_4^{(42)}$, $w_4^{(43)}$, $w_4^{(44)}$ are orthogonal and may be calculated through the above-described method or calculated from other 4-by-4 orthogonal matrices.

$$w_8^{(5)} = \begin{bmatrix} w_4^{(41)} & w_4^{(41)} & w_4^{(42)} & w_4^{(42)} & w_4^{(43)} \\ \phi_{n,1}w_4^{(41)} & -\phi_{n,1}w_4^{(41)} & \phi_{n,2}w_4^{(42)} & -\phi_{n,2}w_4^{(42)} & \phi_{n,3}w_4^{(43)} \end{bmatrix} \text{ or }$$

$$\begin{bmatrix} w_4^{(41)} & w_4^{(41)} & w_4^{(42)} & w_4^{(42)} & w_4^{(44)} \\ \phi_{n,1}w_4^{(41)} & -\phi_{n,1}w_4^{(41)} & \phi_{n,2}w_4^{(42)} & -\phi_{n,2}w_4^{(42)} & \phi_{n,3}w_4^{(44)} \end{bmatrix} \text{ or } \begin{bmatrix} w_4^{(42)} & w_4^{(42)} & w_4^{(43)} & w_4^{(43)} & w_4^{(44)} \\ \phi_{n,1}w_4^{(42)} & -\phi_{n,1}w_4^{(42)} & \phi_{n,2}w_4^{(43)} & -\phi_{n,2}w_4^{(43)} & \phi_{n,3}w_4^{(44)} \end{bmatrix}$$ [Equation 29]

$$w_8^{(6)} = \begin{bmatrix} w_4^{(41)} & w_4^{(41)} & w_4^{(42)} & w_4^{(42)} & w_4^{(43)} & w_4^{(43)} \\ \phi_{n,1}w_4^{(41)} & -\phi_{n,1}w_4^{(41)} & \phi_{n,2}w_4^{(42)} & -\phi_{n,2}w_4^{(42)} & \phi_{n,3}w_4^{(43)} & -\phi_{n,3}w_4^{(43)} \end{bmatrix}$$ [Equation 30]

$$\text{or } \begin{bmatrix} w_4^{(41)} & w_4^{(41)} & w_4^{(42)} & w_4^{(42)} & w_4^{(44)} & w_4^{(44)} \\ \phi_{n,1}w_4^{(41)} & -\phi_{n,1}w_4^{(41)} & \phi_{n,2}w_4^{(42)} & -\phi_{n,2}w_4^{(42)} & \phi_{n,3}w_4^{(44)} & -\phi_{n,4}w_4^{(44)} \end{bmatrix}$$

$$\text{or } \begin{bmatrix} w_4^{(42)} & w_4^{(42)} & w_4^{(43)} & w_4^{(43)} & w_4^{(44)} & w_4^{(44)} \\ \phi_{n,1}w_4^{(42)} & -\phi_{n,1}w_4^{(42)} & \phi_{n,2}w_4^{(43)} & -\phi_{n,2}w_4^{(43)} & \phi_{n,3}w_4^{(44)} & -\phi_{n,4}w_4^{(44)} \end{bmatrix}$$

In the case of ranks 5 and 6, a codebook as represented by Equation 30 may be configured. $\theta_{n,1}$ is a co-phase of 1-th 4-port codebook and WB and/or SB attributes. For example, it may be applied independently (i.e., value and/or granularity are independently applied) or applied in an integrated manner according to I value when it is 1 bit ({1, j}). One of three matrices in Equation 30, which will be used, may be selected by WB and/or SB attributes or selected as one thereof.

$$w_8^{(7)} = \begin{bmatrix} w_4^{(41)} & w_4^{(41)} & w_4^{(42)} & w_4^{(42)} & w_4^{(43)} & w_4^{(43)} & w_4^{(44)} \\ \phi_{n,1}w_4^{(41)} & -\phi_{n,1}w_4^{(41)} & \phi_{n,2}w_4^{(42)} & -\phi_{n,2}w_4^{(42)} & \phi_{n,3}w_4^{(43)} & -\phi_{n,3}w_4^{(43)} & \phi_{n,4}w_4^{(44)} \end{bmatrix}$$

$$w_8^{(8)} = \begin{bmatrix} w_4^{(41)} & w_4^{(41)} & w_4^{(42)} & w_4^{(42)} & w_4^{(43)} & w_4^{(43)} & w_4^{(44)} & w_4^{(44)} \\ \phi_{n,1}w_4^{(41)} & -\phi_{n,1}w_4^{(41)} & \phi_{n,2}w_4^{(42)} & -\phi_{n,2}w_4^{(42)} & \phi_{n,3}w_4^{(43)} & -\phi_{n,3}w_4^{(43)} & \phi_{n,4}w_4^{(44)} & -\phi_{n,4}w_4^{(44)} \end{bmatrix}$$

[Equation 31]

In the case of ranks 7 and 8, a codebook as represented by Equation 31 may be configured. $\theta_{n,1}$ is a co-phase of 1-th 4-port codebook and WB and/or SB attributes. For example, it may be applied independently (i.e., value and/or granularity are independently applied) or applied in an integrated manner according to I value when it is 1 bit ({1, j}). Particularly, since rank 8 and/or rank 7 are full ranks, $\phi_{n,1}$ may be fixed to a specific value without SB reporting attribute.

Although the above-described codebook configuration methods according to embodiments of the present disclosure relate to uplink codebook configuration, these codebook configuration methods can be equally applied to downlink.

Codebook configuration factors with WB TPMI attributes (or factors with high signaling overhead) may be indicated to a UE through a MAC control element (CE) or additional signaling. In addition, SB TPMI attributes (or factors with low signaling overhead) may be indicated through downlink control information (DCI). All of the above-described codebooks proposed in embodiments of the preset disclosure may be limited such that TPMI is indicated through MAC CE or additional signaling having a large signaling container size. For example, as in LTE PUCCH CSI feedback mode 2-1, an eNB may determine whether a UL channel is frequency selective using an SRS of a UE and signal, to the UE, whether to perform WB-wise transmission (e.g., non-frequency selective precoding) or SB-wise transmission (e.g., frequency selective precoding) using a 1-bit gNB selected precoding type indicator (gPTI). Since TPMI sizes of frequency selective transmission and non-frequency selective transmission are different, a DCI size may be dynamically changed and signaling may be performed. Alternatively, the eNB may signal transmission to the UE through individual signaling such as signaling non-frequency selective transmission on the basis of DCI and signaling frequency selective transmission using the MAC CE.

Figure 16:
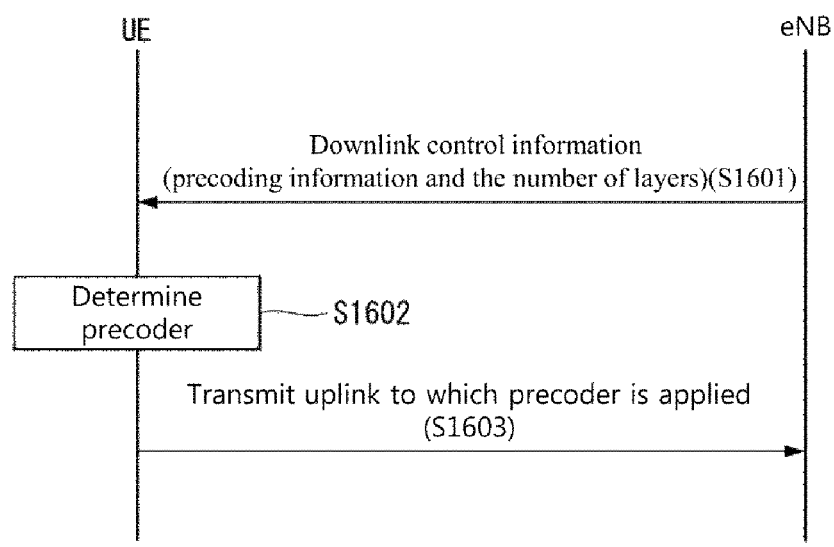
FIG. 16 is a diagram illustrating a codebook-based uplink transmission method according to an embodiment of the present disclosure.

FIG. 16 is a diagram illustrating a codebook-based uplink transmission method according to an embodiment of the present disclosure.

Referring to FIG. 16, a UE receives, from an eNB, downlink control information (DCI) for uplink (i.e., PUSCH) scheduling which includes precoding information and the number of layers (S1601).

Here, the precoding information may be referred to as a transmitted precoding matrix indictor (TPMI) and the number of layers may be referred to as a transmitted rank indictor (TRI).

The eNB may configure a codebook according to an embodiment (i.e., 1. Port (group) quantization codebook, 2. Linear combining codebook, 3. Higher rank design, or a combination of at least one thereof) and determine precoding information and the number of layers to be applied to uplink transmission of the UE on the basis of the configured codebook.

For example, the eNB may include amplitude coefficients and phase coefficients applied to precoders in DCI and transmit the DCI to the UE, as described in "1. Port (Group) quantization codebook".

Here, when two or more antenna ports are set for PUSCH transmission of the UE (e.g., the antenna ports may be set through DCI), an amplitude coefficient for a specific antenna port from among the two or more antenna ports may be predetermined as 1 and amplitude coefficients for antenna ports other than the specific antenna port may be indicted as values relative to the amplitude coefficient for the specific antenna port. Here, the amplitude coefficients for the antenna ports other than the specific antenna port may be 1 or a non-zero value.

In addition, when two or more antenna ports are set for PUSCH transmission of the UE (e.g., the antenna ports may be set through DCI), a phase coefficient for a specific antenna port from among the two or more antenna ports may be predetermined as 0 and phase coefficients for antenna ports other than the specific antenna port may be indicted as values relative to the phase coefficient for the specific antenna port.

Further, the eNB may include information for selecting a specific antenna port (i.e., information indicating an antenna port which corresponds to the specific antenna port from among the two or more antenna ports) in DCI and transmit the DCI to the UE. Alternatively, a specific antenna port from among the two or more antenna ports may be set to a port having a strongest RSRP (Reference Signal Received Power) for a signal (e.g., SRS) transmitted from the UE in the eNB.

Here, selection of the specific antenna port may be commonly applied over a wideband. That is, the specific antenna port may be commonly determined over the wideband. Furthermore, an amplitude coefficient and/or a phase coefficient may be individually determined for each subband.

As described above, a bitwidth for indicating the amplitude coefficient and/or the phase coefficient may be predefined or set by the eNB. Here, the bitwidth for indicating the amplitude coefficient and/or the phase coefficient may be determined by the eNB on the basis of capability signaling of the UE.

To reduce signaling overhead, a set of one or more vectors including values for amplitude coefficients and/or phase coefficients as elements may be predefined and an amplitude coefficient vector and/or a phase coefficient vector may be determined in the defined set of one or more vectors. The DCI may further include information indicating the amplitude coefficient vector and the phase coefficient vector in the set of one or more vectors.

The UE determines a precoder on the basis of the precoding information and the number of layers (S1602).

The UE transmits uplink (i.e., PUSCH) to which the determined precoder is applied to the eNB (S1603).

General Devices to which the Present Disclosure is Applicable

Figure 17:
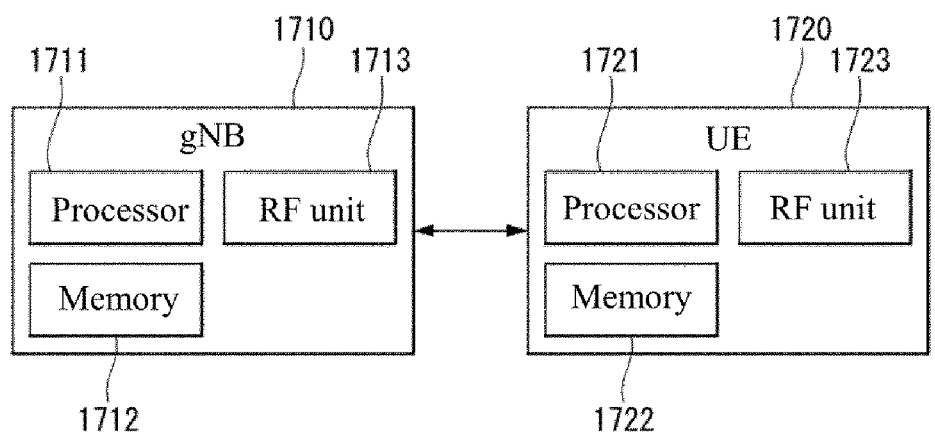
FIG. 17 is a block diagram of a wireless communication device according to an embodiment of the present disclosure.

FIG. 17 is a block diagram of wireless communication devices according to an embodiment of the present disclosure.

Referring to FIG. 17, a wireless communication system includes an eNB 1710 and a plurality of UEs 1720 located within the area of the eNB 1710.

The eNB 1710 includes a processor 1711, a memory 1712 and a radio frequency (RF) unit 1713 (or transceiver). The processor 1711 implements functions, processed and/or methods proposed in FIGS. 1 to 16. Radio interface protocol layers may be implemented by the processor 1711. The memory 1712 is connected to the processor 1711 and stores various types of information for operating the processor 1711. The RF unit 1713 is connected to the processor 1711, transmits and/or receives RF signals.

The UE 1720 includes a processor 1721, a memory 1722 and an RF unit 1723 (or transceiver). The processor 1721 implements functions, processed and/or methods proposed in FIGS. 1 to 16. Radio interface protocol layers may be implemented by the processor 1721. The memory 1722 is connected to the processor 1721 and stores various types of information for operating the processor 1721. The RF unit 1723 is connected to the processor 1721, transmits and/or receives RF signals.

The memories 1712 and 1722 may be provided inside or outside the processors 1711 and 1721 and may be connected to the processors 1711 and 1721 through known means. Furthermore, the eNB 1710 and/or the UE 1720 may include single antenna or multiple antennas.

The aforementioned embodiments have been achieved by combining the elements and characteristics of the present disclosure in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present disclosure. Order of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative, but should be construed as being illustrative from all aspects. The scope of the present disclosure should be determined by reasonable analysis of the attached claims, and all changes within the equivalent range of the present disclosure are included in the scope of the present disclosure.

INDUSTRIAL APPLICABILITY

Although examples in which the present disclosure is applied to 3GPP LTE/LTE-A have been chiefly described, the present disclosure can be applied to various wireless communication systems (e.g., 5G systems) in addition to 3GPP LTE/LTE=A.

The invention claimed is:

1. A method for performing codebook-based uplink transmission by a user equipment (UE) in a wireless communication system, the method comprising:
    receiving, from an evolved Node B (eNB), downlink control information (DCI) for physical uplink shared channel (PUSCH) scheduling including precoding information and a number of layers;
    determining a precoder on the basis of the precoding information and the number of layers; and
    transmitting a PUSCH, to which the determined precoder is applied, to the eNB,
    wherein the DCI further includes an amplitude coefficient and a phase coefficient applied to the precoder.

2. The method of claim 1, wherein, when two or more antenna ports of the UE are set for PUSCH transmission, an amplitude coefficient for a specific antenna port from among the two or more antenna ports is predetermined as 1 and an amplitude coefficient for each antenna port other than the specific antenna port are indicted as a value relative to the amplitude coefficient for the specific antenna port.

3. The method of claim 2, wherein the amplitude coefficient for each antenna port other than the specific antenna port is 1 or a non-zero value.

4. The method of claim 2, wherein the DCI further includes information indicating which one of the two or more antenna ports corresponds to the specific antenna port.

5. The method of claim 4, wherein the specific antenna port is commonly determined over a wideband.

6. The method of claim 4, wherein the amplitude coefficient and/or the phase coefficient are individually determined for each subband.

7. The method of claim 2, wherein the specific antenna port among the two or more antenna ports is set to a port having a strongest reference signal received power (RSRP) for a signal transmitted from the UE to the eNB.

8. The method of claim 1, wherein, when two or more antenna ports of the UE are set for the PUSCH transmission, a phase coefficient for a specific antenna port from among the two or more antenna ports is predetermined as 0 and a phase coefficient for each antenna port other than the specific antenna port is indicted as a value relative to the phase coefficient for the specific antenna port.

9. The method of claim 8, wherein the DCI further includes information indicating which one of the two or more antenna ports corresponds to the specific antenna port.

10. The method of claim 8, wherein the specific antenna port among the two or more antenna ports is set to a port having a strongest reference signal received power (RSRP) for a signal transmitted from the UE to the eNB.

11. The method of claim 1, wherein a bitwidth for indicating the amplitude coefficient and/or the phase coefficient is predefined or set by the eNB.

12. The method of claim 1, wherein a bitwidth for indicating the amplitude coefficient and/or the phase coefficient is determined on the basis of capability signaling of the UE.

13. The method of claim 1, wherein a set of one or more vectors including values for amplitude coefficients and/or phase coefficients as elements is predefined, and the DCI further includes information indicating an amplitude coefficient vector and/or a phase coefficient vector in the set of one or more vectors.

14. A user equipment (UE) performing codebook-based uplink transmission in a wireless communication system, the UE comprising:
a transceiver for transmitting and receiving radio frequency (RF) signals; and
a processor for controlling the transceiver,
wherein the processor is configured:
to receive, from an evolved Node B(eNB), downlink control information (DCI) for physical uplink shared channel (PUSCH) scheduling including precoding information and a number of layers;
to determine a precoder on the basis of the precoding information and the number of layers; and
to transmit a PUSCH, to which the determined precoder is applied, to the eNB,
wherein the DCI further includes an amplitude coefficient and a phase coefficient applied to the precoder.

* * * * *